US008139853B2

(12) United States Patent
Mojsilovic

(10) Patent No.: US 8,139,853 B2
(45) Date of Patent: Mar. 20, 2012

(54) COLOR NAMING, COLOR CATEGORIZATION AND DESCRIBING COLOR COMPOSITION OF IMAGES

(75) Inventor: Aleksandra Mojsilovic, New York, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/108,547

(22) Filed: May 16, 2011

(65) Prior Publication Data
US 2011/0216973 A1 Sep. 8, 2011

Related U.S. Application Data

(60) Division of application No. 12/123,681, filed on May 20, 2008, now Pat. No. 8,000,524, which is a continuation of application No. 10/530,138, filed as application No. PCT/US02/29974 on Sep. 20, 2002, now Pat. No. 7,415,153.

(51) Int. Cl.
*G06K 9/00* (2006.01)
(52) U.S. Cl. ........................................ 382/165; 707/724
(58) Field of Classification Search .................. 382/100, 382/162, 165, 170, 181, 190, 195, 224; 345/426, 345/428, 589, 591, 611, 619; 707/722–737
See application file for complete search history.

(56) References Cited

U.S. PATENT DOCUMENTS

| | | | |
|---|---|---|---|
| 4,488,245 A | 12/1984 | Dalke et al. | |
| 4,991,223 A | 2/1991 | Bradley | |
| 5,047,842 A | 9/1991 | Bouman, Jr. et al. | |
| 5,254,978 A | 10/1993 | Beretta | |
| 5,343,311 A * | 8/1994 | Morag et al. | 358/518 |
| 5,416,890 A | 5/1995 | Beretta | |
| 5,517,334 A | 5/1996 | Morag et al. | |
| 5,680,327 A | 10/1997 | Cook et al. | |
| 5,943,059 A | 8/1999 | Satoh et al. | |
| 6,081,276 A * | 6/2000 | Delp | 345/589 |
| 6,326,974 B1 | 12/2001 | Satoh et al. | |
| 6,360,008 B1 | 3/2002 | Suzuki et al. | |
| 6,469,706 B1 | 10/2002 | Syeda-Mahmood | |
| 6,591,007 B1 * | 7/2003 | Petkovic et al. | 382/162 |
| 6,665,439 B1 * | 12/2003 | Takahashi | 382/199 |
| 6,757,428 B1 | 6/2004 | Lin et al. | |
| 2002/0054237 A1 * | 5/2002 | Nichogi | 348/453 |
| 2002/0150290 A1 * | 10/2002 | Robins et al. | 382/162 |
| 2003/0012428 A1 | 1/2003 | Syeda-Mahmood | |
| 2004/0165773 A1 | 8/2004 | Katsuyama | |
| 2007/0091106 A1 * | 4/2007 | Moroney | 345/581 |

* cited by examiner

*Primary Examiner* — Anand Bhatnagar
(74) *Attorney, Agent, or Firm* — Cantor Colburn LLP; Vazken Alexanian

(57) ABSTRACT

The invention provides methods, systems and apparatus for assigning color names to individual image pixels, and generating verbal description of color composition in images, suitable for a wide variety of information processing applications. For an isolated image pixel (individual color sample or color value) an illustrative embodiment of this invention uses a predetermined vocabulary of color names, and then generates a distance measure describing the best color match and corresponding color name for the given pixel. For the input image, an illustrative embodiment of this invention computes the simplified representation of the scene, consistent with human perception, and uses the predetermined vocabulary, syntax rules and metric to assign color names to all perceptually significant objects and regions and obtain the verbal description of the overall color composition. The invention is also applicable to other types of information signals, such as sequences of video frames, web pages, etc.

3 Claims, 27 Drawing Sheets

| Centroid | Munsell | RGB |
|---|---|---|
| 1 Vivid Pink | 1r 8.0 13.0 | #FF7E93 |
| 2 Strong Pink | 1.2r 6.9 8.2 | #FD7B7C |
| 3 Deep Pink | 2.1r 6.0 11.1 | #F3545E |
| 4 Light Pink | 2.6r 8.5 4.0 | #FFBCAD |
| 5 Moderate Pink | 2.8r 7.2 5.3 | #EE9086 |
| 6 Dark Pink | 2.7r 5.9 6.1 | #C76864 |
| 7 Pale Pink | 2.0r 8.7 2.1 | #FFCBBB |
| 8 Grayish Pink | 2.6r 7.2 2.3 | #CF9B8F |
| 9 Pinkish White | 5.8r 9.0 0.8 | #F9DBC8 |
| 10 Pinkish Gray | 9.8r 7.4 1.0 | #C8A696 |
| 11 Vivid Red | 5.0r 3.9 15.4 | #C10020 |
| 12 Strong Red | 4.0r 4.4 12.1 | #BF2233 |
| 13 Deep Red | 5.1r 2.8 10.1 | #7B001C |
| 14 Very Deep Red | 6.5r 1.7 8.4 | #4F0014 |
| 15 Moderate Red | 3.8r 4.4 9.1 | #AB343A |
| 16 Dark Red | 4.0r 2.8 6.8 | #681C23 |
| 17 Very Dark Red | 2.0r 1.2 4.8 | #320A18 |
| 18 Light Grayish Red | 5.3r 5.9 3.5 | #B17267 |
| 19 Grayish Red | 4.0r 4.4 4.8 | #8C4743 |
| 20 Dark Grayish Red | 2.9r 2.7 2.1 | #482A2A |
| 21 Blackish Red | 3.9r 0.8 1.7 | #1F0E11 |
| 22 Reddish Gray | 7.0r 5.4 1.3 | #8B6C62 |
| 23 Dark Reddish Gray | 6.0r 3.4 1.0 | #523C36 |
| 24 Reddish Black | 2.0r 0.9 0.9 | #1E1112 |

Fig. 2A

| | | |
|---|---|---|
| 25 Vivid Yellowish Pink | 8.0r 8.0 13.0 | #FF845C |
| 26 Strong Yellowish Pink | 8.4r 7.0 9.5 | #FF7A5C |
| 27 Deep Yellowish Pink | 5.5r 5.8 12.1 | #F64A46 |
| 28 Light Yellowish Pink | 1.9yr 8.2 4.6 | #FFB28B |
| 29 Moderate Yellowish Pink | 0.7yr 7.2 4.9 | #EE9374 |
| 30 Dark Yellowish Pink | 7.0r 6.0 6.1 | #CC6C5C |
| 31 Pale Yellowish Pink | 4.2yr 8.6 2.2 | #FFC8A8 |
| 32 Grayish Yellowish Pink | 1.3yr 7.2 2.4 | #D39B85 |
| 33 Brownish Pink | 7.0yr 7.1 2.3 | #CD9A7B |
| 34 Vivid Reddish Orange | 9.8r 5.4 14.5 | #F13A13 |
| 35 Strong Reddish Orange | 9.3r 5.4 12.2 | #FFB961 |
| 36 Deep Reddish Orange | 9.2r 3.9 12.1 | #A91D11 |
| 37 Moderate Reddish Orange | 9.3r 5.5 9.2 | #D35339 |
| 38 Dark Reddish Orange | 9.3r 4.0 9.1 | #9B2F1F |
| 39 Grayish Reddish Orange | 0.4yr 5.4 6.2 | #B85D43 |
| 40 Strong Reddish Brown | 0.3yr 3.1 9.9 | #7F180D |
| 41 Deep Reddish Brown | 1.6yr 1.5 8.3 | #490005 |
| 42 Light Reddish Brown | 0.5yr 5.5 4.1 | #AA6651 |
| 43 Moderate Reddish Brown | 9.0r 3.4 5.2 | #712F26 |
| 44 Dark Reddish Brown | 9.6r 1.3 3.6 | #321011 |
| 45 Light Grayish Reddish Brown | 2.9yr 5.4 2.3 | #966A57 |
| 46 Grayish Reddish Brown | 9.0r 3.4 2.4 | #5E3830 |
| 47 Dark Grayish Reddish Brown | 9.0r 2.0 2.0 | #371F1C |
| 48 Vivid Orange | 4.1yr 6.5 15.0 | #FF6800 |
| 49 Brilliant Orange | 4.0yr 9.0 12.0 | #FFB841 |

Fig. 2B

| 50 Strong Orange | 4.3yr 6.5 12.2 | #FF6F1A |
|---|---|---|
| 51 Deep Orange | 4.1yr 5.1 11.3 | #C34D0A |
| 52 Light Orange | 4.8yr 7.8 7.2 | #FFA161 |
| 53 Moderate Orange | 4.6yr 6.5 8.2 | #E8793E |
| 54 Brownish Orange | 4.1yr 5.0 8.0 | #B15124 |
| 55 Strong Brown | 4.6yr 3.5 7.6 | #753313 |
| 56 Deep Brown | 5.6yr 2.4 5.2 | #4D220E |
| 57 Light Brown | 5.4yr 5.4 4.8 | #A86540 |
| 58 Moderate Brown | 5.6yr 3.5 3.9 | #673923 |
| 59 Dark Brown | 5.3yr 1.6 3.4 | #35170C |
| 60 Light Grayish Brown | 6.4yr 5.4 2.2 | #946B54 |
| 61 Grayish Brown | 5.5yr 3.5 1.8 | #5A3D30 |
| 62 Dark Grayish Brown | 5.5yr 2.0 1.5 | #32221A |
| 63 Light Brownish Gray | 7.0yr 5.4 1.2 | #8B6D5C |
| 64 Brownish Gray | 5.65r 3.4 0.9 | #503D33 |
| 65 Brownish Black | 7.8yr 0.6 0.9 | #140F0B |
| 66 Vivid Orange Yellow | 8.6yr 7.3 15.2 | #FF8E00 |
| 67 Brilliant Orange Yellow | 0.1y 8.1 10.5 | #FFB02E |
| 68 Strong Orange Yellow | 9.1yr 7.1 11.6 | #FF8E0D |
| 69 Deep Orange Yellow | 8.6yr 6.0 12.1 | #D76E00 |
| 70 Light Orange Yellow | 9.4yr 8.3 6.8 | #FFB961 |
| 71 Moderate Orange Yellow | 8.7yr 7.2 8.3 | #F7943C |
| 72 Dark Orange Yellow | 9.3yr 6.0 7.9 | #C37629 |
| 73 Pale Orange Yellow | 9.2yr 8.7 4.4 | #FFCA86 |
| 74 Strong Yellowish Brown | 8.8yr 4.6 8.5 | #95500C |

Fig. 2C

| | | |
|---|---|---|
| 75 Deep Yellowish Brown | 8.8yr 3.1 5.0 | #593315 |
| 76 Light Yellowish Brown | 8.7yr 6.5 5.0 | #BB8B54 |
| 77 Moderate Yellowish Brown | 9.5yr 4.4 3.9 | #7D512D |
| 78 Dark Yellowish Brown | 9.4yr 2.3 3.3 | #3F2512 |
| 79 Light Grayish Yellowish Brown | 9.7yr 6.4 2.5 | #B48764 |
| 80 Grayish Yellowish Brown | 9.5yr 4.6 2.1 | #785840 |
| 81 Dark Grayish Yellowish Brown | 8.8yr 2.5 1.6 | #3D2B1F |
| 82 Vivid Yellow | 3.3y 8.0 14.3 | #FFB300 |
| 83 Brilliant Yellow | 4.4y 8.7 8.9 | #FFCF40 |
| 84 Strong Yellow | 3.7y 7.2 9.3 | #E59E1F |
| 85 Deep Yellow | 3.7y 5.9 9.1 | #B57900 |
| 86 Light Yellow | 4.3y 8.8 6.8 | #FFD35F |
| 87 Moderate Yellow | 3.8y 7.1 6.5 | #D79D41 |
| 88 Dark Yellow | 3.9y 6.0 6.4 | #B07D2B |
| 89 Pale Yellow | 4.7y 9.0 3.8 | #FFDB8B |
| 90 Grayish Yellow | 4.4y 7.2 3.8 | #CEA262 |
| 91 Dark Grayish Yellow | 3.8y 5.9 4.0 | #A47C45 |
| 92 Yellowish White | 4.5y 9.2 1.2 | #FFE2B7 |
| 93 Yellowish Gray | 3.8y 7.4 1.4 | #CAA885 |
| 94 Light Olive Brown | 2.1y 4.9 7.9 | #945D0B |
| 95 Moderate Olive Brown | 2.7y 3.6 5.5 | #64400F |
| 96 Dark Olive Brown | 2.0y 1.9 2.2 | #302112 |
| 97 Vivid Greenish Yellow | 9.1y 8.2 12.0 | #F4C800 |
| 98 Brilliant Greenish Yellow | 9.8y 8.8 9.5 | #FFDC33 |

Fig. 2D

| | | |
|---|---|---|
| 99 Strong Greenish Yellow | 9.2y 7.2 9.2 | #CCA817 |
| 100 Deep Greenish Yellow | 9.2y 5.9 9.2 | #9F8200 |
| 101 Light Greenish Yellow | 9.8y 8.9 7.0 | #FFDE5A |
| 102 Moderate Greenish Yellow | 9.5y 7.1 6.5 | #C4A43D |
| 103 Dark Greenish Yellow | 9.4y 5.9 6.3 | #9B8127 |
| 104 Pale Greenish Yellow | 9.5y 9.0 4.2 | #FFDF84 |
| 105 Grayish Greenish Yellow | 9.0y 7.2 3.9 | #C4A55F |
| 106 Light Olive | 8.2y 5.1 5.6 | #846A20 |
| 107 Moderate Olive | 7.6y 3.8 5.4 | #5E490F |
| 108 Dark Olive | 8.9y 2.4 3.1 | #362C12 |
| 109 Light Grayish Olive | 7.85y 5.5 2.5 | #8B734B |
| 110 Grayish Olive | 8.0y 3.6 2.0 | #52442C |
| 111 Dark Grayish Olive | 9.7y 2.0 1.8 | #2B2517 |
| 112 Light Olive Gray | 6.9y 5.5 1.3 | #887359 |
| 113 Olive Gray | 8.1y 3.5 0.9 | #4D4234 |
| 114 Olive Black | 9.0y 1.1 0.9 | #121910 |
| 115 Vivid Yellowish Green | 5.4gy 6.8 11.2 | #93AA00 |
| 116 Brilliant Yellow Green | 4.9gy 8.2 9.1 | #CED23A |
| 117 Strong Yellow Green | 5.4gy 6.0 8.7 | #7F8F18 |
| 118 Deep Yellow Green | 7.4gy 4.2 7.1 | #425E17 |
| 119 Light Yellow Green | 5.0gy 8.4 5.6 | #DCD36A |
| 120 Moderate Yellow Green | 4.8gy 6.0 5.0 | #8B8940 |
| 121 Pale Yellowish Green | 3.4gy 8.7 2.4 | #F0D698 |
| 122 Grayish Yellowish Green | 4.4gy 6.0 2.3 | #90845B |
| 123 Strong Olive Green | 4.0gy 3.0 11.0 | #0A4500 |

Fig. 2E

| | | |
|---|---|---|
| 124 Deep Olive Green | 4.0gy 1.5 11.0 | #142300 |
| 125 Moderate Olive Green | 5.7gy 3.6 4.8 | #434B1B |
| 126 Dark Olive Green | 8.0gy 2.2 3.6 | #232C16 |
| 127 Grayish Olive Green | 4.6gy 3.5 2.0 | #48442D |
| 128 Dark Grayish Olive Green | 5.4gy 2.0 1.8 | #27261A |
| 129 Vivid Yellowish Green | 1.1g 5.9 11.2 | #379931 |
| 130 Brilliant Yellowish Green | 0.3g 7.7 8.6 | #8CCB5E |
| 131 Strong Yellowish Green | 0.4g 5.4 8.7 | #478430 |
| 132 Deep Yellowish Green | 0.9g 3.5 9.0 | #00541F |
| 133 Very Deep Yellowish Green | 10.0gy 1.5 11 | #002800 |
| 134 Very Light Yellowish Green | 0.2g 8.6 4.6 | #C6DF90 |
| 135 Light Yellowish Green | 0.7g 7.4 5.2 | #007BA7 |
| 136 Moderate Yellowish Green | 0.5g 5.5 4.8 | #657F4B |
| 137 Dark Yellowish Green | 0.6g 3.5 5.0 | #304B26 |
| 138 Very Dark Yellowish Green | 0.3g 1.8 4.3 | #132712 |
| 139 Vivid Green | 3.2g 4.9 11.1 | #007D34 |
| 140 Brilliant Green | 6.2g 6.5 8.3 | #47A76A |
| 141 Strong Green | 5.8g 4.4 8.7 | #006B3C |
| 142 Deep Green | 5.1g 3.0 8.1 | #004524 |
| 143 Very Light Green | 6.5g 7.8 4.9 | #98C793 |
| 144 Light Green | 6.0g 6.4 5.1 | #719B6E |
| 145 Moderate Green | 6.3g 4.5 5.1 | #386646 |
| 146 Dark Green | 6.6g 2.8 4.6 | #203A27 |
| 147 Very Dark Green | 8.0g 1.8 3.0 | #16251C |
| 148 Very Pale Green | 7.3g 8.8 1.9 | #D8DEBA |

Fig. 2F

| | | |
|---|---|---|
| 149 Pale Green | 7.6g 6.4 1.7 | #8D917A |
| 150 Grayish Green | 8.8g 4.5 1.8 | #575E4E |
| 151 Dark Greenish Yellowish Green | 1.0bg 2.9 1.8 | #313830 |
| 152 Blackish Green | 10.0g 1.0 1.4 | #141613 |
| 153 Greenish White | 10.0g 9.2 0.8 | #F5E6CB |
| 154 Light Greenish Gray | 3.0g 7.5 0.9 | #BAAF96 |
| 155 Greenish Gray | 7.5g 5.5 1.0 | #7A7666 |
| 156 Dark Greenish Gray | 1.5bg 3.5 0.9 | #45433B |
| 157 Greenish Black | 8.7g 1.0 0.7 | #181513 |
| 158 Vivid Bluish Green | 5.0bg 5.0 13.0 | #00836E |
| 159 Brilliant Bluish Green | 2.9bg 6.0 9.6 | #009B76 |
| 160 Strong Bluish Green | 4.6bg 4.5 8.5 | #006D5B |
| 161 Deep Bluish Green | 2.8bg 2.4 8.3 | #00382B |
| 162 Very Light Bluish Green | 4.4bg 8.3 4.6 | #A0D6B4 |
| 163 Light Bluish Green | 4.6bg 6.5 4.9 | #669E85 |
| 164 Moderate Bluish Green | 4.6bg 4.5 5.0 | #2F6556 |
| 165 Dark Bluish Green | 4.9bg 2.7 5.0 | #013A33 |
| 166 Very Dark Bluish Green | 3.6bg 1.2 4.0 | #001D18 |
| 167 Vivid Greenish Blue | 5.0b 5.0 13.0 | #007BA7 |
| 168 Brilliant Greenish Blue | 4.6b 5.9 7.7 | #2A8D9C |
| 169 Strong Greenish Blue | 4.9b 4.5 8.4 | #00677E |
| 170 Deep Greenish Blue | 5.0b 5.0 13.0 | #007BA7 |
| 171 Very Light Greenish Blue | 4.0b 8.0 4.0 | #A3C6C0 |
| 172 Light Greenish Blue | 4.5b 6.5 5.4 | #649A9E |

Fig. 2G

| | | |
|---|---|---|
| 173 Moderate Greenish Blue | 4.7b 4.5 5.2 | #30626B |
| 174 Dark Greenish Blue | 3.7b 2.7 5.0 | #003841 |
| 175 Very Dark Greenish Blue | 5.0b 1.5 3.6 | #022027 |
| 176 Vivid Blue | 5.0b 5.0 14.0 | #007CAD |
| 177 Brilliant Blue | 1.6pb 5.9 9.4 | #4285B4 |
| 178 Strong Blue | 2.9pb 4.1 10.4 | #00538A |
| 179 Deep Blue | 2.8pb 2.5 7.9 | #002F55 |
| 180 Very Light Blue | 2.7pb 7.9 6.0 | #A6BDD7 |
| 181 Light Blue | 1.6pb 6.4 6.9 | #6C92AF |
| 182 Moderate Blue | 3.0pb 4.3 6.8 | #395778 |
| 183 Dark Blue | 2.2pb 1.7 5.5 | #002137 |
| 184 Very Pale Blue | 1.5pb 8.3 3.3 | #C1CACA |
| 185 Pale Blue | 0.6pb 6.5 2.6 | #919192 |
| 186 Grayish Blue | 0.2pb 4.2 3.0 | #4A545C |
| 187 Dark Grayish Blue | 9.2b 2.7 2.0 | #2C3337 |
| 188 Blackish Blue | 9.8b 1.3 1.5 | #161A1E |
| 189 Bluish White | 9.2b 9.1 1.2 | #F9DFCF |
| 190 Light Bluish Gray | 8.2b 7.5 1.0 | #BEADA1 |
| 191 Bluish Gray | 8.9b 5.5 0.9 | #7D746D |
| 192 Dark Bluish Gray | 0.3pb 3.6 1.1 | #464544 |
| 193 Bluish Black | 9.6b 1.1 0.8 | #151719 |
| 194 Very Purplish Blue | 7.8pb 2.0 12.5 | #20155E |
| 195 Brilliant Purplish Blue | 7.3pb 5.1 9.0 | #62639B |
| 196 Strong Purplish Blue | 8.0pb 4.0 10.9 | #474389 |
| 197 Deep Purplish Blue | 7.8pb 1.5 8.0 | #1A153F |

Fig. 2H

| | | |
|---|---|---|
| 198 Very Light Purplish Blue | 7.4pb 7.6 5.2 | #BAACC7 |
| 199 Light Purplish Blue | 7.3pb 6.0 6.5 | #837DA2 |
| 200 Moderate Purplish Blue | 7.9pb 3.5 6.5 | #423C63 |
| 201 Dark Purplish Blue | 8.0pb 1.3 4.3 | #1A162A |
| 202 Very Pale Purplish Blue | 7.0pb 8.0 3.7 | #CBBAC5 |
| 203 Pale Purplish Blue | 7.0pb 6.0 3.9 | #8A7F8E |
| 204 Grayish Purplish Blue | 6.9pb 3.4 3.8 | #413D51 |
| 205 Vivid Violet | 2.0p 5.0 14.0 | #884BAE |
| 206 Brilliant Violet | 9.9pb 5.1 9.4 | #755D9A |
| 207 Strong Violet | 0.2p 3.7 10.1 | #53377A |
| 208 Deep Violet | 1.1p 1.2 8.6 | #240935 |
| 209 Very Light Violet | 2.0p 8.5 7.0 | #EEBEF1 |
| 210 Light Violet | 0.5p 5.6 7.1 | #876C99 |
| 211 Moderate Violet | 1.4p 3.6 7.0 | #543964 |
| 212 Dark Violet | 1.4p 1.3 4.9 | #22132B |
| 213 Very Pale Violet | 9.7pb 7.9 3.7 | #D8B1BF |
| 214 Pale Violet | 1.3p 6.0 4.0 | #957B8D |
| 215 Grayish Violet | 1.2p 3.3 3.9 | #46394B |
| 216 Vivid Purple | 6.0p 4.5 14.0 | #943391 |
| 217 Brilliant Purple | 6.0p 7.0 11.0 | #DD80CC |
| 218 Strong Purple | 6.5p 4.3 9.2 | #803E75 |
| 219 Deep Purple | 6.3p 2.7 9.1 | #531A50 |
| 220 Very Deep Purple | 5.0p 1.5 8.0 | #320B35 |
| 221 Very Light Purple | 6.5p 7.8 5.1 | #E3A9BE |
| 222 Light Purple | 6.2p 6.5 6.5 | #BA7FA2 |

Fig. 2I

| | | |
|---|---|---|
| 223 Moderate Purple | 6.6p 4.5 7.1 | #7F4870 |
| 224 Dark Purple | 6.3p 2.8 4.9 | #472A3F |
| 225 Very Dark Purple | 6.9p 1.0 4.5 | #230D21 |
| 226 Very Pale Purple | 5.5p 8.2 3.2 | #E6BBC1 |
| 227 Pale Purple | 7.9p 6.4 3.1 | #AE848B |
| 228 Grayish Purple | 8.1p 4.5 2.7 | #72525C |
| 229 Dark Grayish Purple | 0.5rp 2.8 2.0 | #452D35 |
| 230 Blackish Purple | 0.8rp 0.9 1.6 | #1D1018 |
| 231 Purplish White | 2.5rp 9.0 0.8 | #FADBC8 |
| 232 Light Purplish Gray | 0.3rp 7.5 1.1 | #C8A99E |
| 233 Purplish Gray | 1.0rp 5.5 0.9 | #88706B |
| 234 Dark Purplish Gray | 1.0rp 3.6 1.0 | #564042 |
| 235 Purplish Black | 9.54p 0.9 0.6 | #1B1116 |
| 236 Vivid Reddish Purple | 1.0rp 3.0 14.0 | #7E0059 |
| 237 Strong Reddish Purple | 1.3rp 4.4 10.2 | #9A366B |
| 238 Deep Reddish Purple | 1.0rp 2.8 9.5 | #641349 |
| 239 Very Deep Reddish Purple | 0.9rp 1.9 8.9 | #470736 |
| 240 Light Reddish Purple | 0.7rp 6.0 6.9 | #BB6C8A |
| 241 Moderate Reddish Purple | 0.8rp 4.5 7.0 | #8C4566 |
| 242 Dark Reddish Purple | 1.3rp 2.8 4.8 | #4F273A |
| 243 Very Dark Reddish Purple | 1.5rp 1.0 4.8 | #270A1F |
| 244 Pale Reddish Purple | 1.3rp 6.0 4.2 | #AC7580 |
| 245 Grayish Reddish Purple | 1.0rp 4.5 4.2 | #7D4D5D |
| 246 Brilliant Purplish Pink | 6.0rp 8.5 11.0 | #FF97BB |
| 247 Strong Purplish Pink | 5.6rp 6.8 9.0 | #F6768E |

Fig. 2J

| | | |
|---|---|---|
| 248 Deep Purplish Pink | 4.4rp 6.0 12.2 | #EB5284 |
| 249 Light Purplish Pink | 4.6rp 8.0 5.5 | #FFA8AF |
| 250 Moderate Purplish Pink | 4.6rp 6.8 6.7 | #E28090 |
| 251 Dark Purplish Pink | 6.4rp 5.9 7.0 | #C76574 |
| 252 Pale Purplish Pink | 3.7rp 8.4 3.3 | #FDBDBA |
| 253 Grayish Purplish Pink | 3.7rp 7.0 3.5 | #CC9293 |
| 254 Vivid Purplish Red | 7.6rp 4.9 13.6 | #D5265B |
| 255 Strong Purplish Red | 7.3rp 4.4 11.4 | #B32851 |
| 256 Deep Purplish Red | 7.3rp 2.6 10.1 | #6F0035 |
| 257 Very Deep Purplish Red | 6.8rp 1.7 8.0 | #470027 |
| 258 Moderate Purplish Red | 7.1rp 4.5 9.0 | #A73853 |
| 259 Dark Purplish Red | 7.1rp 2.7 6.0 | #5B1E31 |
| 260 Very Dark Purplish Red | 6.6rp 0.9 4.8 | #28071A |
| 261 Light Grayish Purplish Red | 7.8rp 5.9 4.2 | #B27070 |
| 262 Grayish Purplish Red | 7.0rp 4.5 5.1 | #8C4852 |
| 263 White | 2.5pb 9.5 0.2 | #FFC9D7 |
| 264 Light Gray | 6.7y 7.4 0.2 | #C2A894 |
| 265 Medium Gray | 3.3gy 5.4 0.1 | #817066 |
| 266 Dark Gray | 2.5pb 3.5 0.0 | #49423D |
| 267 Black | 2.5pb 0.8 0.0 | #131313 |

Fig. 2K

<color name> :: <chromatic name> | <achromatic name>

<chromatic name> :: <lightness><saturation><hue> | <saturation><lightness> <hue>

<achromatic name> :: <lightness> <achromatic term>

<lightness> :: blackish | very dark | dark | medium | light | very light | whitish <saturation> :: grayish | moderate | medium | strong | vivid <hue> :: <generic hue> | <hue modifier> <generic hue>

<generic hue> :: red | orange | brown | yellow | green | blue | purple | pink | beige | olive <hue modifier> :: <generic hue> | <ish form>

<ish form> :: reddish | brownish | yellowish | greenish | bluish | purplish | pinkish <achromatic term> :: <generic achromatic term> | <ish form> <generic achromatic term>

<generic achromatic term> :: gray | black | white

Fig. 2L

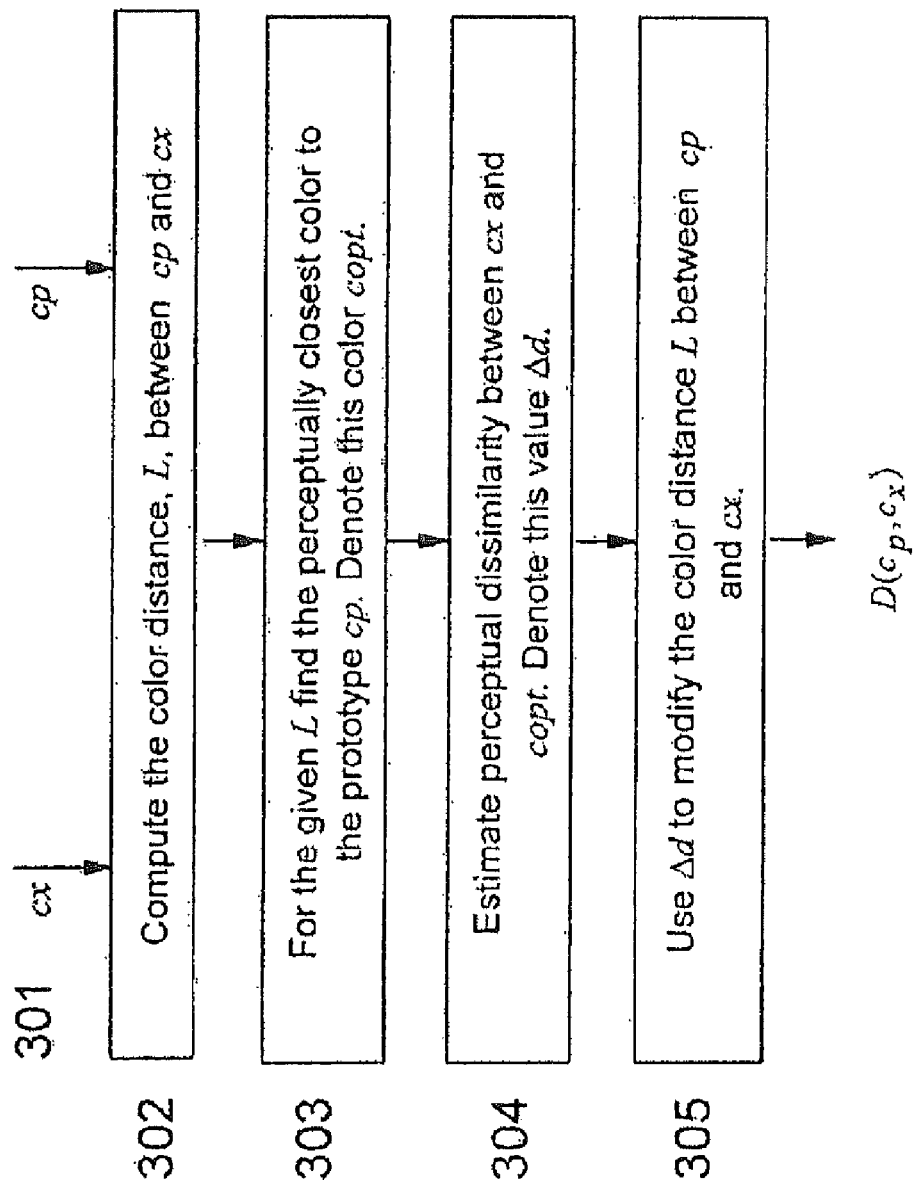

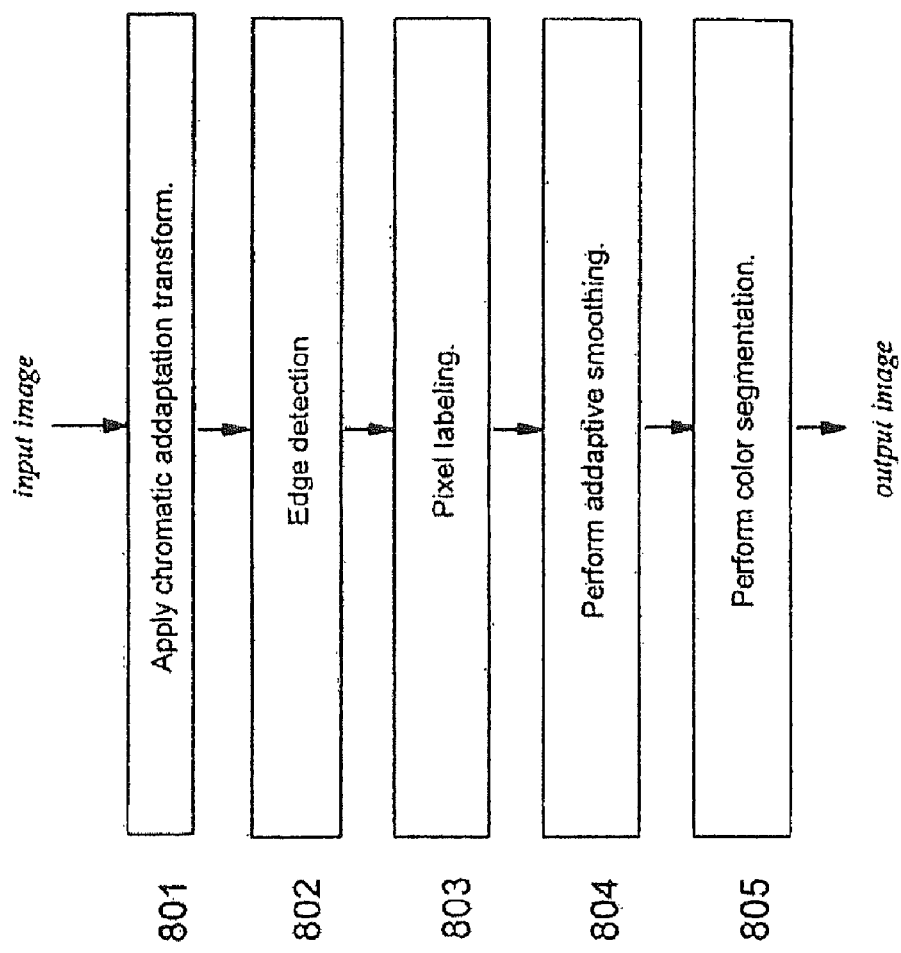

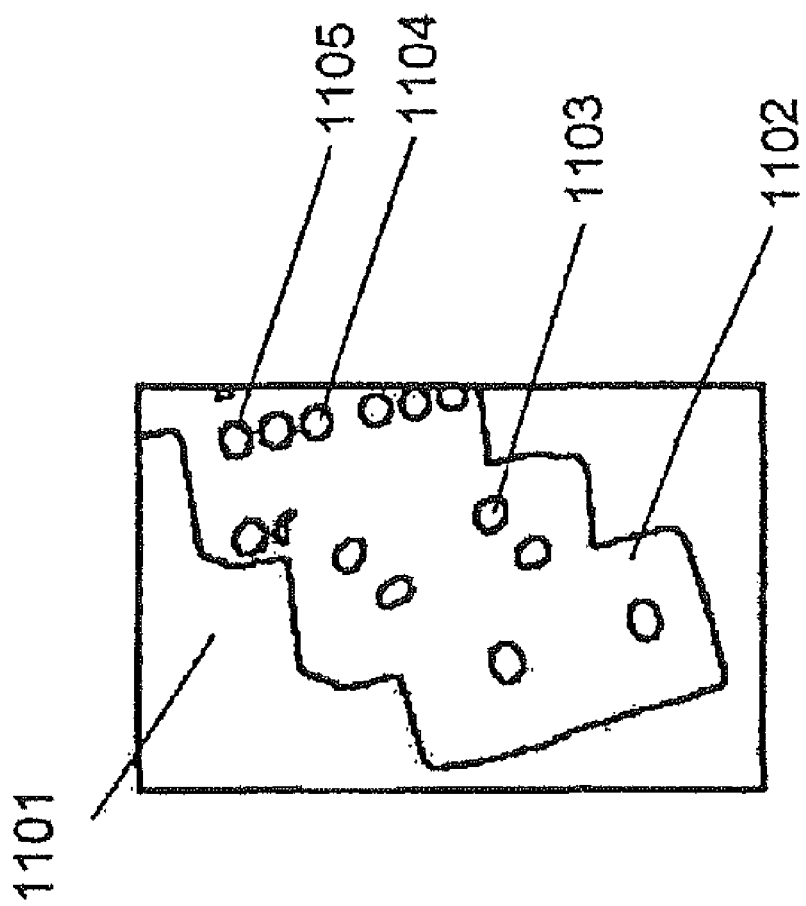
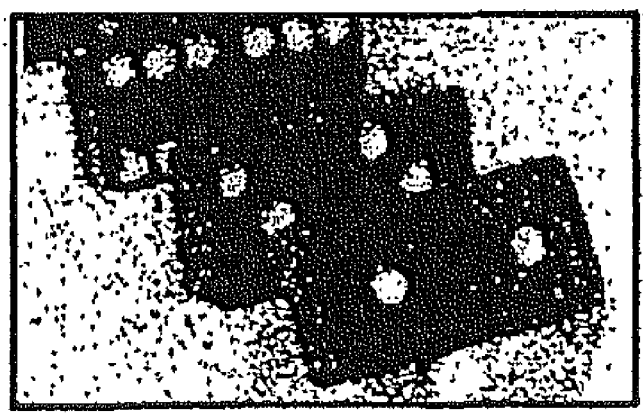

Fundamental level (lowest precission)

<color name> : <generic hue> | <generic achromatic term>

Coarse level (gross precission)

<color name> : <lightness> <generic hue> | <lightness> <generic achromatic term>

Medium level (medium precission)

<color name> : <saturation> <lightness> <generic hue> | <saturation> <lightness> <generic achromatic term>

Detailed level (highest precission)

<color name> : <chromatic name> | <achromatic name> i.e. the full color name as defined by the syntax of the color name Vocabulary

FIGURE 13

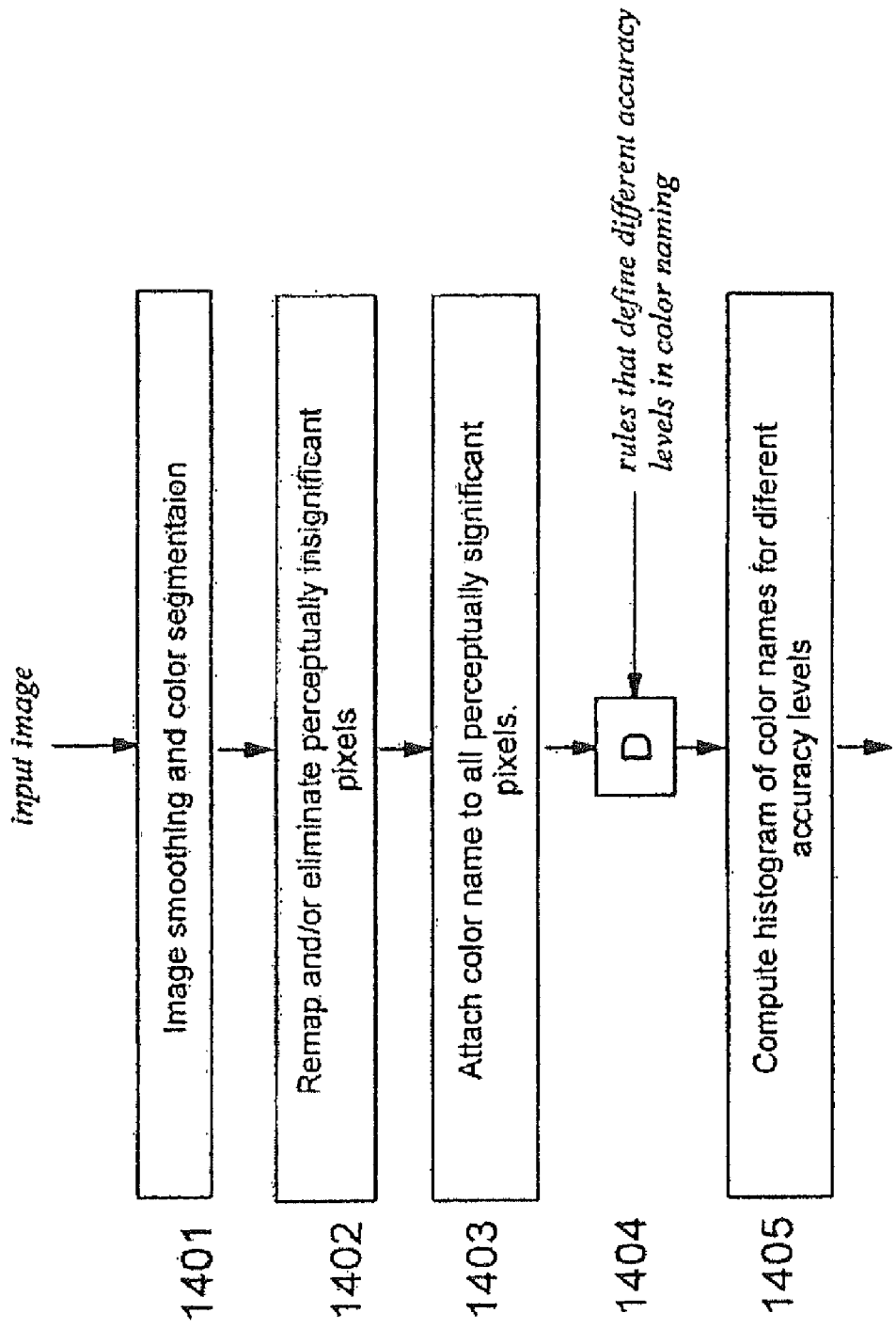

| Detailed | Medium | Coarse | Fundamental |
|---|---|---|---|
| strong purplish red (29%)<br>vivid yellow (21%)<br>moderate pink (22%)<br>moderate dark pink (9%)<br>strong light yellowish green (4%) | strong red (29%)<br>vivid yellow (21%)<br>moderate pink (22%)<br>moderate dark pink (9%)<br>light green (4%) | red (29%)<br>yellow (21%)<br>pink (22%)<br>dark pink (9%)<br>light green (4%) | red (29%)<br>yellow (21%)<br>pink (31%)<br>green (4%) |

COLOR NAMING, COLOR CATEGORIZATION AND DESCRIBING COLOR COMPOSITION OF IMAGES

CROSS-REFERENCE TO RELATED APPLICATION

This application is a divisional application of U.S. patent application Ser. No. 12/123,681, filed May 20, 2008, now U.S. Pat. No. 8,000,524 which is a continuation of U.S. patent application Ser. No. 10/530,138, filed on Apr. 4, 2005, which is now U.S. Pat. No. 7,415,153, which issued on Aug. 19, 2008, which is a U.S. national stage of application No. PCT/US02/29974, filed on 20 Sep. 2002, the contents of which are herein incorporated by reference in their entirety.

TECHNICAL FIELD

The present invention is directed to digital images. It is more particularly directed to color management and color analysis methodologies. It is more specifically directed to color categorization, color naming, and color composition of images, video and multimedia objects.

BACKGROUND

Color is one of the main visual cues and has been studied extensively on many different levels, starting from the physics and psychophysics of color, to the use of color principles in practical problems. These include accurate rendering, display and reproduction, image filtering, coding, retrieval, and numerous other applications in scientific visualization, computer graphics, image and video processing. Interestingly, although color naming represents one of the most common visual tasks, it has not received significant attention in the engineering community. Yet today, with rapidly emerging visual technologies and multimedia, and the development of sophisticated user interfaces and human-machine interactions, the ability to name individual colors, point to objects of a certain color, and convey the impression of color composition becomes an increasingly important task. Color cues can be used in interactive visualization and computer graphics. Color naming facilitates natural user interface design. The extraction of higher-level color descriptors represents a challenging problem in image analysis and computer vision, as these descriptors often provide link to image content. When combined with image segmentation, it would be advantageous to be able to use color naming to select objects by color, describe the appearance of the image and even generate semantic annotations.

For example, regions labeled as light blue and strong green may represent sky and grass, vivid colors are typically found in man-made objects, while modifiers such as brownish, grayish and dark convey the impression of the atmosphere in the scene.

The applications mentioned so far use a flexible computational model for color categorization, color naming or extraction of color composition (i.e. color appearance of a given scene or image to a human observer). Modeling human behavior in color categorization involves solving, or at least providing some answers to several important problems. The first problem involves the definition of the basic color categories and "most representative examples", called prototypical colors, which play a special role in structuring these color categories. Another issue is how to expand the notion of basic color terms into a "general" yet precise vocabulary of color names that can be used in different applications. The next problem involves the definition of category membership. Although the idea that color categories are formed around prototypical examples has received striking support in many studies, the mechanisms of color categorization and category membership are not yet fully understood.

According to the theories postulated to explain human perception, color vision is initiated in retina where the three types of cones receive the light stimulus. The cone responses are then coded into one achromatic and two antagonistic chromatic signals. These signals are interpreted in the cortex, in the context of other visual information received at the same time and the previously accumulated visual experience (memory). Once the intrinsic character of colored surface has been represented internally, one may think that the color processing is complete. However, an ever-present fact about human cognition is that people go beyond the purely perceptual experience to classify things as members of categories and attach linguistic labels to them. Color is no exception. That color categories are perceptually significant can be demonstrated by the "striped" appearance of the rainbow. In physical terms, the rainbow is just a light with the wavelength changing smoothly from 400-700 nm. The unmistakable stripes of color in the rainbow suggest an experimental basis for the articulation of color into at least some categories. However, to model color naming, it is not sufficient to define the color names as functions of the wavelength range. This would account only for pure monochromatic stimuli, which are very rare in real-world situations, and would also leave out non-spectral colors like brown, white and black. Breakthroughs in the current understanding of color categorization came from several sources. This includes a cross-cultural study, which studied the color naming behavior with subjects from variety of languages. Twenty languages were examined experimentally and another 78 through the literature review and discovered remarkable regularities in the shape of the basic color vocabulary. As a result of their study, a concept of basic color terms were introduced which lead to work on defining the color categories corresponding to these basic terms. Eleven basic terms were identified in English: black, white, red, green, yellow, blue, brown, pink, orange, purple and gray. Experiments also demonstrated that the humans perform much better in picking the "best example" for each of the color terms than in establishing the boundaries between the categories. This lead to the definition of focal colors representing the centers of color categories, and the hypothesis of graded (fuzzy) membership. Many later studies have proven this hypothesis, indicating that prototypical colors play a crucial role in internal representation of color categories, and the membership in color categories seem to be represented relative to the prototype. Unfortunately, the mechanism of color naming is still not completely understood. There exist few theoretical models of color naming based explicitly on neurophysiology of color vision and addressing the universality of color foci and graded membership. Apart from not being developed or implemented as full-fledged computational models, these have important drawbacks. In one model membership in color categories is formalized in terms of fuzzy set theory, by allowing the objects to be members of a given set to some degree. In terms of color categories, this means that a focal or prototypical color will be represented as having a membership degree of 1 for its category. Other, non-focal colors will have membership degrees that decrease systematically with the distance from the focal color in some color space. However, this model considers only four fuzzy sets (red, green, yellow and blue), and supporting other color terms requires the introduction of new and ad hoc fuzzy set operations. Furthermore, it is not clear how the non-spectral basic color categories, such as brown, pink and gray are to be dealt with, nor how to incorporate the learning of color names into the model. Another model defines four physical parameters of the stimulus: wavelength, intensity, purity and adaptation state of the retina. According to this model, the pre-cortical visual system performs analog-to-digital conversion of these four parameters, and represents eleven basic color categories as specific combinations of the quantized values. Although interesting for its attempt to take adaptation into account, this model is clearly a gross simplification, which cannot hold in general.

Although color spaces allow for color specification in unambiguous manner, in everyday life colors are mainly identified by their names. Although this requires a fairly general color vocabulary and is far from being precise, identifying a color by its name is a method of communication that everyone understands. Hence, there were several attempts towards designing a vocabulary, syntax and standard method for choosing color names. The Munsell color order system known to those skilled in the art, is widely used in applications requiring precise specification of colors. Examples include production of paints, textiles, etc. It is often used as an industry standard, complemented by Munsell's Book of Color which includes 1,200 precisely controlled samples of colors (chips). The chips are arranged such that unit steps between them are intended to be perceptually equal. Each chip is identified by a 3-part code. The brightness scale is represented by the Munsell value with black denoted by 0/ and white by 10/. Munsell chroma increases in steps of two (/2, /4, . . . , /10). The hue scale is divided into 10 hues: red (R), yellow-red (YR), yellow (Y), green-yellow (GY), green (G), blue-green (BG), blue (B), purple-blue (PB), purple (P), red-purple (RP), each hue can be further divided into ten sections. One notable disadvantage of the Munsell system for the color-based processing is the lack of the exact transform from any color spaces to Munsell. For example, a transform proposed by others is fairly complicated and sometimes inaccurate for certain regions of CIE XYZ.

The first listing of over 3000 English words and phrases used to name colors was devised by Maerz and Paul and published in a Dictionary of colors. Even more detailed was a dictionary published by The National Bureau of Standards. It included about 7500 different names that came to general use in specific fields such as biology, geology, philately, textile, dyes and paint industry. Both dictionaries include examples of rare or esoteric words, and the terms are listed in entirely unsystematic manner, making them unsuitable for general use. Following the recommendation of the Inter-Society Council, the National Bureau of Standards developed the ISCC-NBS dictionary of color names for 267 regions in color space. This dictionary employs English terms to describe colors along the three dimensions of the color space: hue, brightness and saturation. One problem with the ISCC-NBS model is the lack of systematic syntax. This was addressed during the design of a new Color-Naming System (CNS). The CNS was based in part on the ISCC-NBS model. It uses the same three dimensions, however the rules used to combine words from these dimensions are defined in a formal syntax. An extension of the CNS model, called the Color-Naming Method (CNM), uses a systematic syntax similar to the one described in the CNS model, and maps the color names from the CNM into color ranges in the Munsell system. All the aforementioned methods are closely related to the Munsell model and thus provide explanation on how to locate each name within the Munsell color space. However, it is not obvious how to use these methods to automatically attach a color name to a color sample, point out examples of named colors, describe the color region and objects in a scene, and ultimately communicate the color composition of the image.

One approach to these problems discloses a process for creating a color name dictionary and for querying an image by color name. The steps of the disclosed process are to identify a preferred color space, which is then divided into a plurality of color space segments, and a color name is assigned to each of the plurality of color segments. In accordance with this invention, a color name dictionary defines a set of the color names and color name boundaries, advantageously in a three-dimensional visually uniform color space. Each color name is represented by a volume in the color space. Given an input pixel, the color name is assigned using a disclosed method, which identifies the volume that includes the color value of the input pixel. However, many psychophysical experiments, have demonstrated that the humans perform much better in picking the "best example" for each of the color terms than in establishing the boundaries between the color names or color categories, and most importantly, that prototypical colors play a crucial role in internal representation of color categories, as the membership in color categories seem to be represented relative to the prototype.

The aforementioned approach also provides a method for querying image by color name. The steps of the disclosed process involve direct application of the color naming method to individual image pixels and computing the fractional count for each color name from the dictionary. To allow for more specific descriptions, the image is divided into a fixed set of regions defined by the image region dictionary (center, bottom, bottom left, etc.), the fractional counts are also computed for each region, and that representation is used to answer queries such as "Which of images in the database have most of color name red in top-right region". However, this representation is not in agreement with the way humans perceive images and describe their color composition. Humans do not perceive image content as being in top or bottom right portion of the image—they perform logical analysis (image segmentation) and extract meaningful regions and objects from that image. Humans then describe these objects with a single color, e.g. "sky is blue", not by the fractional count of the color names occurring within. Furthermore, it is well known that although digital images may include millions of colors, only a very small number of these are actually perceived. Therefore, the direct representation of the color name histogram does not match the representation generated by the human visual system.

A computational model that is better matched to human behavior in naming individual colors has been proposed in this method uses color naming data and applies a variant of the Gaussian normal distribution as a category model. However, this method is constrained to the lowest level of color naming, as it was fitted to the eleven basic color names. For example, although it allows for the intermediate hues, such as greenish yellow, the model does not account for commonly used saturation or luminance modifiers, such as vivid orange or light blue. Since the quality of color categorization depends on the intricate fitting procedure, there is no straightforward extension of the model to include these attributes and the model cannot be used with other sets of color names.

As may be appreciated, due to the shortcomings of the existing methodologies, there is a long-felt and unfulfilled need for a broader computational color naming method that will provide more detailed color descriptions and allow for the higher-level color communication to: automatically attach a color name to a color sample, point out examples of named colors, describe the color region and objects in a scene, and ultimately communicate the overall color composition of an image

SUMMARY

The foregoing problems are overcome, and other advantages are realized, in accordance with the presently described embodiments and their teachings. Thus, an aspect of this invention is to provide methods, apparatus and systems for automatic color naming, color categorization, and for the automatic derivation of color composition in images. These apply to individual color values to automatically determine a color name for a given color value. The method also applies to digitally represented images, to: 1) automatically attach a color name to each pixel in the image, 2) automatically attach a color name to the regions and objects in the image, 3) point out examples of named colors within the image, 4) generate the verbal description of color composition, 5) replace objects and regions with the named color, with the different color, also specified by its name.

Another aspect is to apply, the term color value to any representation used to specify or describe colors in an unambiguous manner. Example embodiments include, but are not limited to (r, g, b), (L, a, b), (x, y, z), (h, s, v) vectors, when color is specified in the RGB, Lab, XYZ and HSV color spaces, respectively. The provided methods are generally based on the vocabulary of color names and color naming metric derived from perceptual experiments. The method follows relevant studies on human categorization, and, captures human behavior in describing individual colors and color composition of complex images (an image that contains multiple objects, patterns, edges, or colors). There are numerous interesting applications for color naming in image processing, analysis and computer vision. To start with, using color names to label regions can often provide meaningful image segmentation, since the neighboring regions that share the same color name are very likely to belong to the same object. When combined with image segmentation, color naming can be used to select objects by color, describe the appearance of the image and even generate semantic annotations, since in many cases color names only, or in combination with other image features (such as spatial attributes, boundary and size features), provide valuable information about images and reveal their semantic meaning For example, regions labeled as light blue and strong green may represent sky and grass, vivid colors are typically found in man-made objects, while modifiers such as brownish, grayish and dark convey the impression of the atmosphere in the scene.

The techniques and apparatus described here possess several desirable properties. First, color naming operation is performed in a perceptually controlled way, so that the names attached to different colors reflect perceived color differences among them. Segmenting the color space into the color categories produces smooth regions. The methods account for the basic color terms and uses systematic syntax to combine them. It respects the graded nature of category membership, the universality of color foci, and produces results in agreement with human judgments. The first step in the method for determining the color name for an arbitrary input color this method, involves the selection of a balanced and well-represented set of color prototypes, i.e. vocabulary, and the corresponding color naming syntax. Color categorization is then carried through the color naming metric. Assuming a well-represented set of color name prototypes, the metric computes the distance between the input color and all the prototypes from the vocabulary. The "optimal" color name for the input color value is then assigned by taking the color name prototype, which corresponds to the minimum value of the color naming metric. The color naming metric is designed to overcome the limitations of existing color distance functions (such as Euclidean distance in a selected color space), and most importantly to account for the way humans perceive differences in the color-name domain.

Also described is a method for attaching the color name to each meaningful region in a digital image. According to this method, digital image is first subjected to the chromatic transformation to compensate for the differences in illumination conditions, with respect to both intensity and spectral characteristics. In the next step image pixels are subjected to labeling procedure. In one, but not limiting embodiment, each pixel is labeled uniform, texture, color edge, texture edge or noise. These labels drive the adaptive low-pass filtering operation that accounts for the spatial averaging processes in the early stages of the human visual system. The smoothed image is then subjected to color segmentation. This operation produces a simplified version of the image, i.e. a version which resembles the way humans interpret color information. The mean color value for each region from the color segmentation is then mapped into the corresponding color name, using the previously described method. The technique described also allows the user to provide an example color name, and then inspects the color name attached to image regions to find the occurrences of the specified color name in the input image. The method is not limited to digital images or collections of digital images (such as digital photographs, digital artwork, output of scanning devices, etc.), it also applies to video, multimedia, or any representation that involves the spatial arrangement of color values. A simplified representation of a scene is a representation that reduced only to the objects and regions that are perceived/processed by a human observer.

Also described is a method for deriving a verbal description, a description that can be verbalized, for describing the color composition of a digital image. To extract color composition, the method starts from the color-segmented image, and using the color naming metric attaches the color name to all perceptually important pixels. In the next step, the histogram of color names is computed and used to generate the description of color composition. The structure and syntax of the designed vocabulary of color names, allow for descriptions at different accuracy levels that simulate different color naming patterns in humans. In the present, but not limited embodiment, at the fundamental level, the color names are expressed as <generic hue> (such as "red" or "blue") or <generic achromatic term> ("gray", "black", "white") from the syntax. At the coarse level, color names are expressed as <luminance><generic hue>, (e.g. "light blue") or <luminance><generic achromatic term> (e.g. "dark gray"). At the medium level, color names are obtained by adding the <saturation> to the coarse descriptions (e.g. "vivid light blue"). Finally, at the detailed level, the <hue modifier> is added (e.g. "light vivid greenish blue").

BRIEF DESCRIPTION OF THE DRAWINGS

The foregoing and other aspects of these teachings are made more evident in the following detailed description of the invention, when read in conjunction with the attached drawing figures, wherein:

FIGS. 2A-2K illustrates an example embodiment of a color naming vocabulary;

FIG. 2L illustrates an example of an embodiment of a color naming syntax;

FIG. 3 is a logic flow diagram that illustrates a method for computing a similarity metric between an arbitrary color value $c_x$ and a color name prototype $c_p$;

FIG. 8 is a logic flow diagram that illustrates an image smoothing algorithm and detection of important regions and objects in an image.

FIG. 11 is an example result of image smoothing, region detection, and attaching the color names to the important regions and objects in the image;

FIG. 13 illustrates an example embodiment of the rules that describe different accuracy levels in expressing the color composition of an image;

FIG. 14 is a logic flow diagram that illustrates a method for the computation of the description of the image color composition;

DETAILED DESCRIPTION

This invention provides image processing methods, apparatus and systems that are generally based on human perception, which: a) attaches a color name to an input color sample, b) describes objects and regions in an image with their color names, and c) generates the verbal description of image color composition. The methods are used in many image processing, computer vision, graphics and visualization applications. The methods enable development of better user interfaces and better man-machine interaction. The methods are implemented using a set of image processing algorithms, that analyze the input color value to determine optimal color name from the vocabulary of color names, and then process the image to break it into meaningful regions, determine the perceived color value of these regions and attach the color names appropriately.

A first example of a method automatically assigns a color name to an input color value, or color sample, without requiring the use of a labor-intensive process where each color sample is labeled manually with the corresponding color name. A second example method, provides an algorithm to automatically label regions and objects in an image with the best describing color names and then generates the verbal description of the overall color composition. These are advantageous in image analysis, in applications dealing with multimedia databases, as well as in the fields of artificial intelligence, visualization, computer graphics, user-interface design and human-machine interaction. As used herein, a scene is consistent with human observation of the scene is consistent in a sense that all the important objects, regions and edges are preserved in the simplified representation, as well as all the colors that the human observer perceives.

Figure 1:
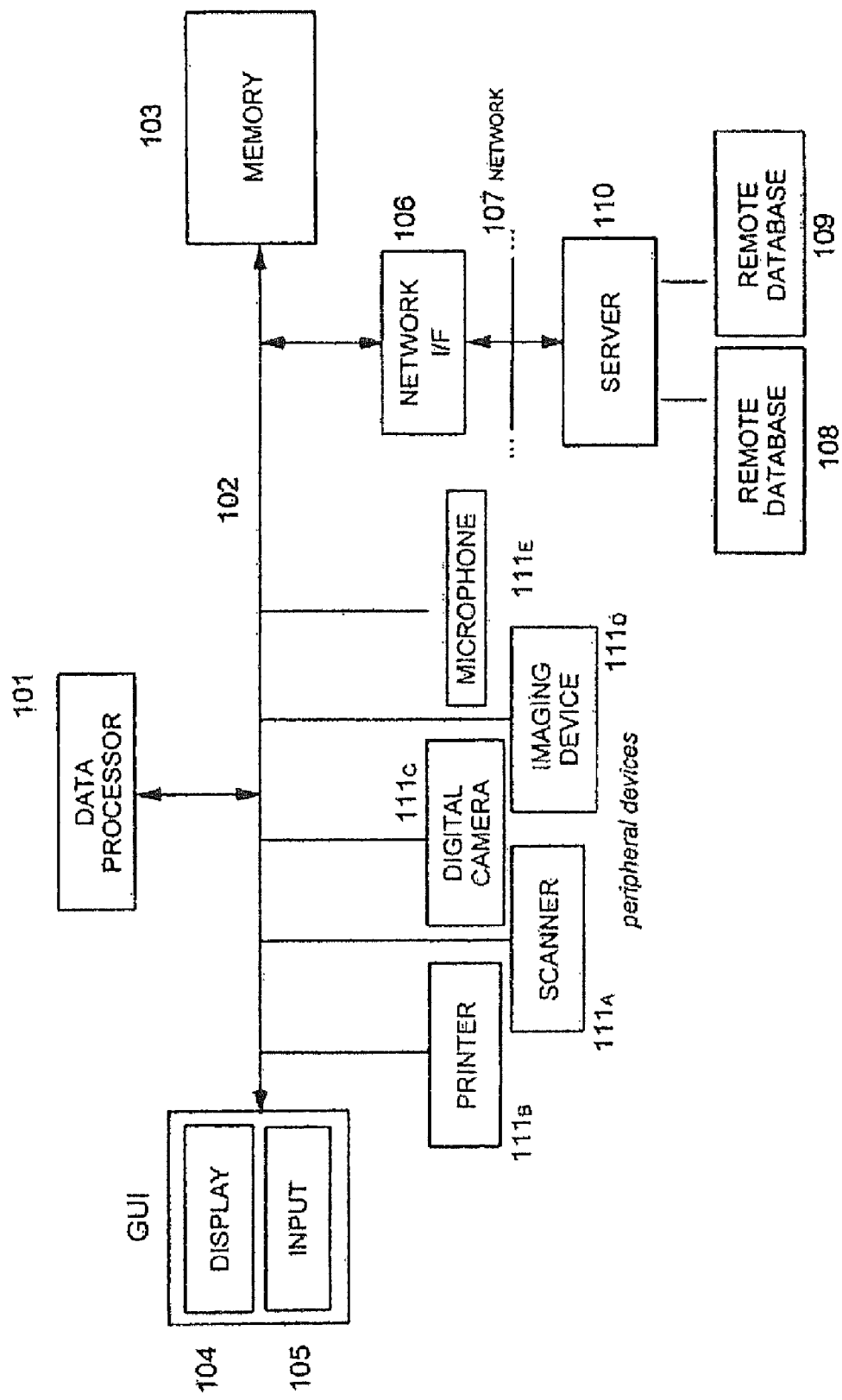
FIG. 1 is a simplified block diagram of a data processing system that is suitable for practicing this invention.

FIG. 1 is a simplified block diagram of an example of an embodiment of a data processing system, 100 that is suitable for practicing the invention, as well as the teachings of the present invention. The data processing system 100 includes at least one data processor 101 coupled to a bus 102 through which the data processor 101 may address a memory subsystem 103, also referred to herein simply as the memory 103. The memory 103 may include RAM, ROM, and fixed or removable storage devices. The memory 103 is assumed to store a program with the program instructions for causing the data processor 101 to execute methods in accordance with the teachings of the invention. Also stored in the memory 103 is at least one database including data representing a vocabulary of color names or pointers to externally stored vocabulary data. Also stored in the memory 103 is a set of color values (or references to externally stored color values), and/or digital image data (or references to externally stored digital image data), and the resulting color naming data (i.e. data obtained by applying the teachings of the invention). The color values may include any color representation used to unambiguously specify color, such as three-element vector specification in the RGB, XYZ, HSV, Lab, Luv, or any other system which may be used to specify colors. The color values may be entered into the memory 103, through any input device (such as keyboard, microphone, colorimetric device, etc.), also they may be obtained through the mean of digital camera, scanner, or by use of any pointing device that selects or produces a certain color, such as mouse, pen, etc. The color values may also be obtained by reading the color information from digital images, by means of speech or character recognition, web pages, 3D models, simulation results, etc. The digital image data represents any spatial arrangement of color values. This may include photographs obtained from a digital camera, or any device that outputs digital images (such as camcorder, electronic microscope, telescope, medical imaging device, etc.), images obtained from a conventional film camera and scanned or digitized into the memory 103, computer generated images, or artworks that are photographed and scanned or digitized into the memory. In general digital image data may be any desired type or types of images, including digitally stored artworks, designs, paintings, forms, web page layouts, medical images, movie shots, screens and shots from video games, etc.

In some embodiments, the data processor 101 is coupled through the bus 102 to a network interface 106 that provides bidirectional access to a data communication network 107, such as intranet and/or Internet. Coupled to the network 107 can be on or more sources and/or repositories of external data, such as a remote digital image database 108, or remote database of color samples and/or color values 109, reachable through an associated server 110. The data processor 101 is also advantageously coupled through the bus 102, or the network 107, to at least one peripheral device 111, such as scanner 111A, printer 111B, digital camera 111C, medical imaging device 111D, microphone 111E, etc. In general these teachings may be implemented using one or more software programs running on a personal computer, a server, a mainframe computer, a portable computer, PDA, an embedded computer, or by any suitable type of programmable data processor. The use of this invention substantially improves analysis, description, annotation and other information processing tasks related to digital images and digital color data. It also substantially improves human-machine interaction and user interface design. The teachings of this invention can also be configured to provide real-time processing of color-related and/or image-related information. The methods may be used to process the color data and/or digital image data stored in or referenced by the database 104 or in remotely stored databases 108, 109 over the network 107 and in cooperation with the server 110.

The foregoing system and methods provide for verbally (i.e. through color names) describing individual colors specified by their color values, colors of object in digital images, as well as for generating the description of the overall color composition, based on the syntax and vocabulary of color names, and the color naming metric. The vocabulary, syntax and the metric are derived advantageously from perceptual experiments performed with human observers.

FIGS. 2A-2K illustrate an example embodiment of a vocabulary of color names, and FIG. 2b illustrates an example, but not limited embodiment of a color naming syntax. Each entry in the vocabulary represents a color name prototype, specified by: 1) its color name, which follows the formal syntax of the color naming language, and 2) its color value in an arbitrary color space. Advantageously, the color value for each of the color name prototypes should represent the centroid of a region (in a perceptually uniform color space) that is described by the corresponding color name.

A set of experiments was conducted to: 1) understand human behavior in describing and naming individual colors, 2) understand human behavior in naming colors within complex scenes, (3) understanding human behavior describing color composition of images, and 4) determine the reliable and general set of color names to be used as the color name vocabulary. As used herein, the term general set of color names refers to a set of color names that is widely and frequently used in everyday life, is understood by the general public, and can most generally fully describe appearance of any object, scene, etc.). Ten subjects participated in the experiments. The vocabulary of color names used in an embodiment, of the invention, was developed starting from the set of color names described by K. Kelly, and D. Judd. Through the set of subjective experiments, the names of colors from the ISCC-NBS dictionary were changed to reflect human judgments in color naming. In these experiments (called Color Naming Experiments) known to those familiar with the art, the subjects were presented with the colors from the ISCC-NBS color dictionary, and asked to name each one of them. The color patches were displayed on the computer monitor.

In the first experiment, 64.times.64 pixel patches were arranged into 9.times.6 matrix and displayed against light gray background. The names were assigned by typing into a text box below each patch. After naming all the colors, the display was updated with the new set of patches, until all 267 colors from the dictionary have been named.

In the second color naming experiment, only one 200.times.200 pixels color patch was displayed on the screen. To analyze the agreement between these two color naming experiment, for each experiment a list of corrected color names was made, i.e. the names from the ISCC-NBS vocabulary were changed to reflect the opinion of the majority of subjects. The two lists showed very good agreement between the experiments. The final vocabulary is determined as the list from the first color naming experiment, since the names were generated in the interaction with other colors, which is seen as a better representation of real-life applications.

The two Color Naming Experiments were also useful for studying the patterns in human color naming behavior. For example, the most noticeable difference between the two color naming experiments was in the use of luminance modifiers. The same color was often perceived brighter when displayed in a small patch (Experiment 1) than in a large window (Experiment 2). Also, very pale and unsaturated (grayish) colors appeared more chromatic when displayed in a smaller window. To better understand the human behavior in color naming, two more subjective experiments were performed. In the first experiment, called Color Listing Experiment, subjects were asked to write on a sheet of paper names of at least twelve "most important" colors. In the second experiment, called Color Composition Experiment, the subjects were presented with 40 photographic images in a sequence and asked to name all the colors in the image. The images were selected to include different color compositions, spatial frequencies and arrangements among the colors, and provide broad content. The subjects were advised to use common color terms, as much as possible, to avoid rare color names, and color names derived from objects and materials. If they found a certain color difficult to name, they were advised to describe it in terms of other colors.

In the Color Listing Experiment 11 basic colors from B. Berlin and P. Kay, "Basic Color Terms: Their Universality and Evolution", Berkeley: University of California, 1969, were found on the list of every subject. Nine subjects included beige, four included violet, two included cyan and magenta, and one included gold and silver. Modifiers for hue, saturation and luminance were not used. None of the subjects listed more than 14 color names. The subjects maintained the same limited vocabulary when describing images in the Color Composition Experiment, and added only beige to the basic colors. The modifiers for hue, saturation and luminance were used only to distinguish between the different types of the same hue in the single image (such as light blue for sky and dark blue for water, or orange yellow and vivid yellow for two different objects). Otherwise, the modifiers were seldom included into description. It was also observed that the subjects were more prone to attaching the modifiers for luminance than the modifiers for saturation.

Although most of the experimental images had rich color histograms, the subjects were not able to perceive more than ten colors at once. Dark colors, which typically exist in natural images due to shadows and edges, or bright colors due to highlights and specularities, were never included in the description, and were named only when referring to well-defined objects/regions. The subjects showed the highest level of precision in the Color Naming Experiments. Most of them (8/10) frequently used modifiers for hue, saturation or brightness. The modifiers for hue were designed either by joining two generic hues with a hyphen, or by attaching the suffix—ish to the farther hue, and leaving the closer hue unchanged. Typically, only two adjacent hues (such as purple and blue, or green and yellow) were combined.

The findings from all four experiments were used to devise the vocabulary depicted in FIG. 2a. The terms for brightness are determined to be: blackish, very dark, dark, medium, light, very light and whitish. The terms for saturation are determined to be: vivid, strong, medium, moderate, grayish. The complete set of generic hues is determined to be: red, green, yellow, blue, orange, pink, purple, brown, beige and olive, with the addition of achromatic names black, white and gray. These findings were expressed in the formal syntax, as illustrated in FIG. 2b.

Having established the vocabulary of color names, in accordance with an aspect of these teachings, the next step is to develop an algorithm for attaching the color name to an arbitrary input color. To address the graded nature of category membership and take into account the universality of color foci, the color categorization should be performed through the color naming metric. Assuming a well-represented set of prototypes (foci), the metric computes the distance between the input color and all the prototypes, thus quantifying the difference between the input color and each color name prototype.

By way of introduction, FIG. 3 shows a logic flow diagram that illustrates an example of a method for computing a similarity metric between a color value (color sample) $c_x$ and a color name prototype $c_p$. The method is assumed to be executed by the data processor 101 under control of a program or program stored in the memory 103. This implementation is based on the finding that the colors that share the same distance (in arbitrary color space) to a color prototype $c_p$, may not be perceived as equally similar to that prototype, in which case the color distance has to be updated proportionally to the amount of dissimilarity. The computation of the color metric between an arbitrary input color $c_x$ and the prototype $c_p$, is then based on: a) computing the distance between $c_x$ and $c_p$ (step 301), b) finding the optimal color match to $c_p$ for the given distance (step 302), c) estimating the perceptual difference between $c_x$ and the optimal color match (step 303), and d) using this estimate to modify the distance between $c_x$ and $c_p$ (step 304).

Figure 4:
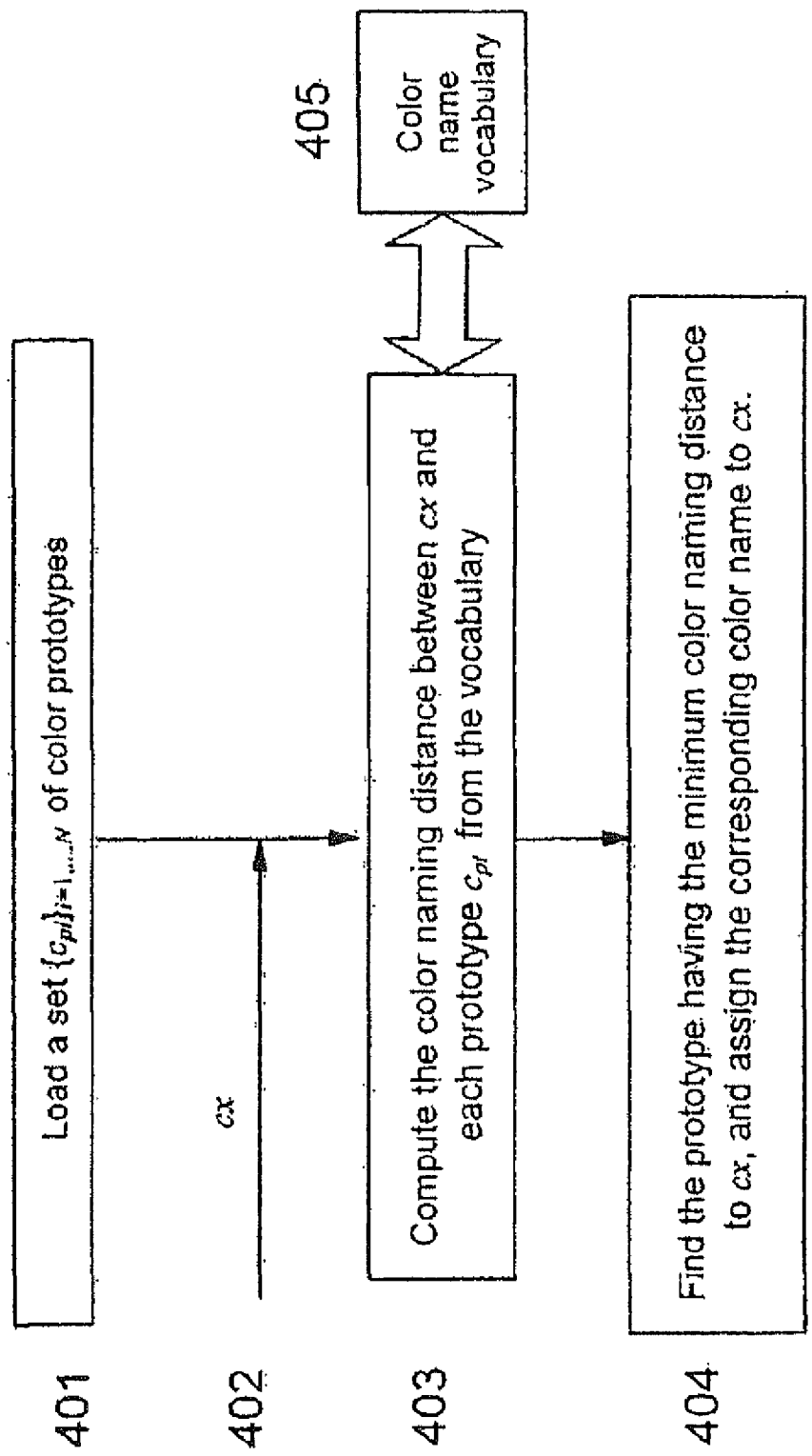
FIG. 4 is a logic flow diagram that illustrates a method for attaching a color name to a color sample $c_x$.

FIG. 4 is a logic flow diagram that illustrates an example of a method for attaching a color name to the input color $c_x$. Step 401 loads a vocabulary of color names, i.e. a set of color prototypes. Step 402 gets the input color value $c_x$. At step 403, the data processing system compares the color value $c_x$ to the color value of each color name prototype from the vocabulary of color names 405, via the color naming metric. At step 404, the data processing system determines the minimum of the color naming metric and attaches the corresponding color name to the input color value $c_x$. It should be understood that the present invention enables multiple vocabularies of color names 405 to be defined, such as, with a different vocabulary 405 specific for a different task or application.

Figure 5:
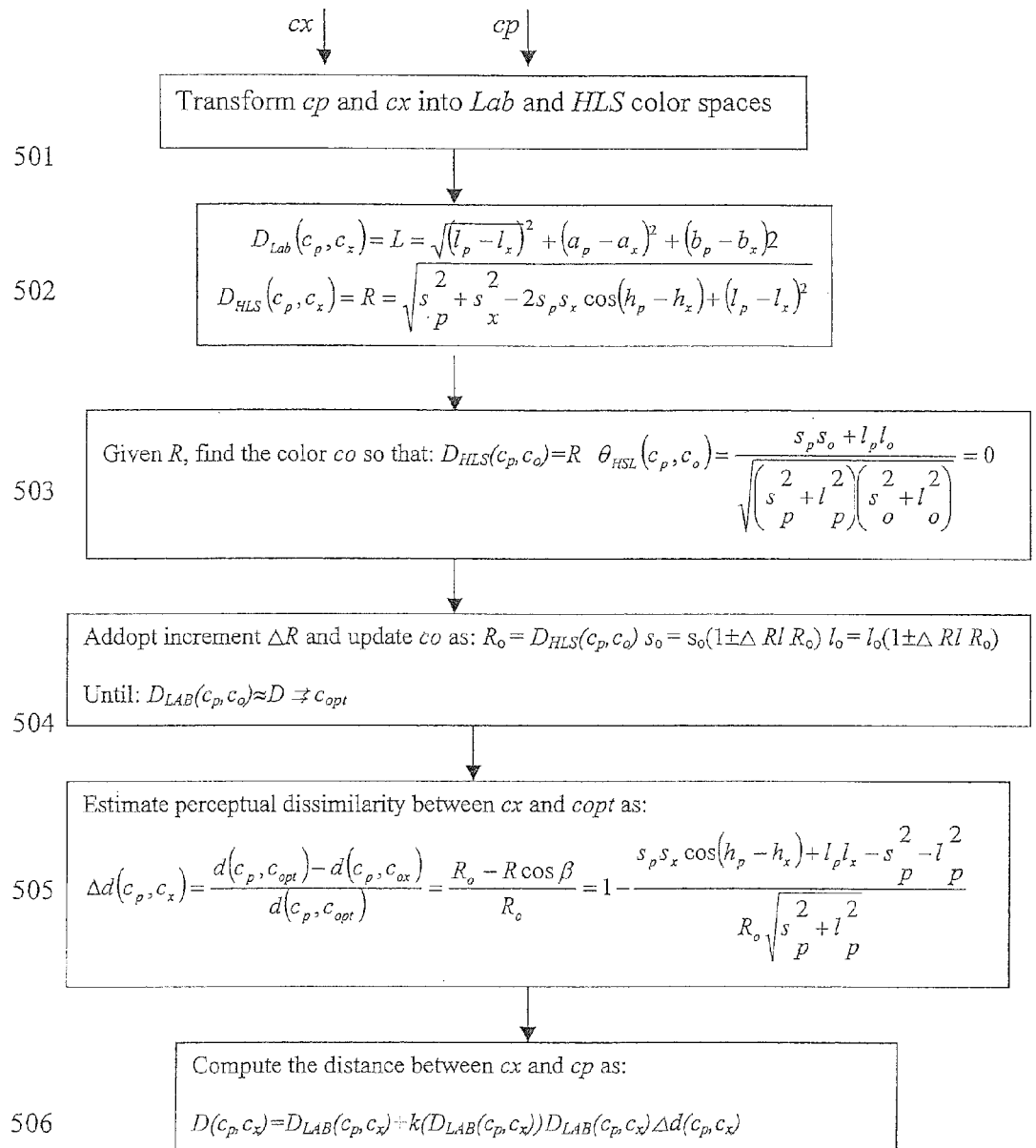
FIG. 5 is a logic flow diagram that illustrates an example implementation of a method for computing a similarity metric between a color value $c_x$ and a color name prototype $c_p$.

By way of introduction, FIG. 5 is a logic flow diagram that illustrates an implementation of an example of a method for computing a similarity metric between a color value (color sample) $c_x$ and a color name prototype $c_p$. The method is generally executed by the data processor 101 under control of a program or program stored in the memory 103. At step 501 the input color values are transformed into Lab and HLS coordinates. At step 502 the data processing system computes the optimal perceptual match to the prototype $c_p$, for the given Lab distance. At step 505, the data processing system estimates the difference between the optimal perceptual match and the input color $c_x$, and at step 506, the data processing system uses that estimate to modify the Lab distance between $c_x$ and $c_p$.

An advantageous embodiment is based on the experimental finding that, although commonly used as measure of color similarity, Euclidean distance in the CIE Lab color space has several serious drawbacks for the use as a color naming metric. A first problem is related to the sparse sampling of the color space. Since the uniformity of the Lab suffers from defects its "nice" perceptual properties remain in effect only within a radius of few just-noticeable differences. Since the vocabulary of color names typically has a small number of color names, the distances between the colors may be large and the Euclidean metric only partially reflects the degree of color similarity. The other, more serious problem is related to human perception of color names and their similarity. Assuming an arbitrary color represented by a point $c_p$ in the Lab space, and a set of neighboring colors $c_{ni}$, i=1, . . . , N on a circle with the radius L in that space, although all the pairs ($c_p$, $c_{ni}$) are equally distant, humans do not perceive them as equally similar. To test the relationship between perceptual similarity, and color distances in different color spaces, a subjective experiment was conducted. Four subjects participated in the experiment. The subjects were given ten sets of color samples. Each set consisted of a "prototype" color $c_p$ and five colors, $c_{ni}$, i=1, . . . , 5 so that $D_{Lab}(c_p, c_{ni})$=const. The distances between the prototype and the rest of the colors ranged from 6 to 30. For each set the subjects were asked to order the samples according to the perceived similarity to the set prototype. These sets were displayed in sequence on a computer monitor with light gray background under the daylight illumination. Each color sample was displayed in the 100×100 pixels window and could be moved on the screen to allow for the comparison with the prototype $c_p$.

For all the pairs, the color distances, and angles between the color vectors were computed in both Lab and HSL spaces. These measurements were analyzed and also correlated with the subject's rankings. The first thing that was observed is that for $D_{Lab}$<7 all the colors were perceived as equally similar to the prototype. In most of the other cases subjects identified the best and worst match unanimously, frequently leaving other samples unranked. Typically, the colors subjects failed to rank were close in all three values. For the colors that were ranked by the subjects, the correlation between the subjects' rankings and rankings determined based on angle in the HSL space was 0.96. The correlation between the subjects' rankings and rankings determined based on the distance in the HSL space was 0.85, and the correlation with the rankings determined based on the angle in the Lab space was only 0.70. The slope of the least square regression line for the subjects' rankings and the rankings assigned according to the angle in the HSL space was 0.97. The slope of the least square regression line for the subjects' rankings and the rankings assigned according to the distance in the HSL space was 0.84, and the slope of the least square regression line for the subjects' rankings and the rankings assigned according to the angle in the Lab space was 0.87. These results indicate that the color angle in the HSL space and the color distance in the HSL space (alone or combined) may be used as predictors of perceptual similarity between the equidistant colors, although none of these two values alone represents an accurate color naming metric.

The color naming metric is then designed to embody the findings from the experiment. It models the behavior of subjects in color categorization. Assuming a prototype $c_p$ and arbitrary input color $c_x$, as discussed previously, for a given $D_{Lab}(c_p,c_x)$, the combination between $\theta_{HSL}(c_p,c_x)$ and $D_{HSL}(c_p,c_x)$ reflects the "reliability" or "goodness" of the Lab distance as the measure of similarity in the color name domain. Thus, this relationship is used to modify $D_{Lab}$ in the following manner. First, the distances between $c_p$ and $c_x$ in the Lab and HSL color spaces is computed as:

$$D_{Lab}(c_p, c_x) = L = \sqrt{(l_p - l_x)^2 + (a_p - a_x)^2 + (b_p - b_x)^2},$$

$$D_{HLS}(c_p, c_x) = R = \sqrt{s_p^2 + s_x^2 - 2s_p s_x \cos(h_p - h_x) + (l_p - l_x)^2}.$$

In the next step, given the radius R, the data processing system finds the color $c_o$: $(h_o, s_o, l_o)$, so that: $D_{HLS}(c_p, c_o) = R$, and $$\theta_{HSL}(c_p, c_o) = \frac{s_p s_o + l_p l_o}{\sqrt{(s_p^2 + l_p^2)(s_o^2 + l_o^2)}} = 0.$$

Solving (1) results in: $h_o = h_p$, $s_{o1,2} = s_p(1 \pm R/\sqrt{(s_p^2 + l_p^2)})$, $l_{o1,2} l_p(1 \pm R/\sqrt{(s_p^2 + l_p^2)})$, and the final solution is obtained by taking a point that is satisfied.

Figure 6:
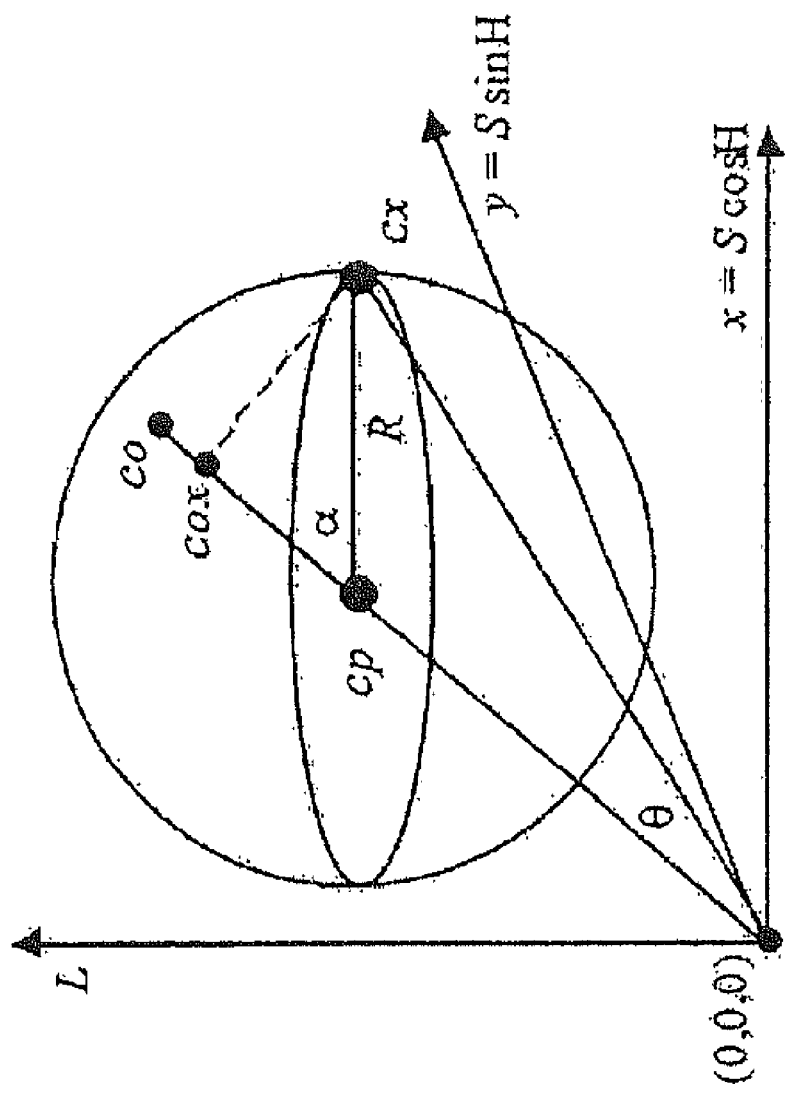
FIG. 6 is a diagram illustrating an example embodiment of the method for computing the color name distance between an input color $c_x$, and a prototype color from the vocabulary $c_p$ (i.e. the computation of the color naming metric)

This procedure is illustrated in FIG. 6. According to the experimental results, given the distance L, the optimal perceptual match corresponds to the direction $\theta_{HSL}(c_p, c_o) = 0$. Assuming a small increment $\Delta R$, the initial solution $c_o$ is then updated in the following manner: $R_o = D_{HSL}(c_p, c_o)$, $s_o = s_o(1 \pm \Delta R/R_o)$, and $l_o = l_o(1 \pm \Delta R/R_o)$, until $D_{lab}(c_p, c_o) \approx D$. At this point, $c_o$ represents an optimal perceptual match to $c_p$, for the given Lab distance. This solution is therefore denoted $c_{opt}$. An estimate of perceptual dissimilarity between $c_x$ and $c_{opt}$ is then computed as a relative difference in the HSL space between $c_{opt}$, and the projection $c_x \perp c_{opt}$:

$$\Delta d(c_p, c_x) = \frac{d(c_p, c_{opt}) - d(c_p, c_{ox})}{d(c_p, c_{opt})}$$

$$= \frac{R_o - R\cos\alpha}{R_o}$$

$$= 1 - \frac{s_p s_x \cos(h_p - h_x) + l_p l_x - s_p^2 - l_p^2}{R_o \sqrt{s_p^2 + l_p^2}}$$

Figure 7A:
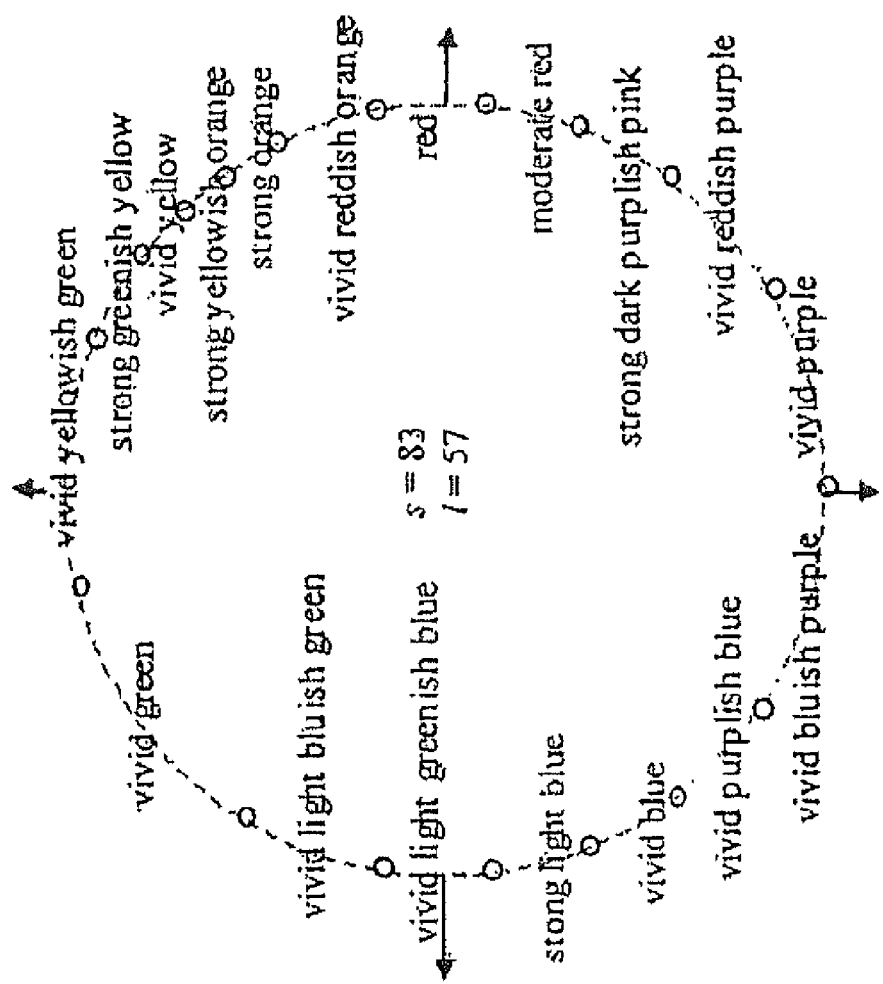
FIG. 7a shows an application of a color naming method to name different color regions for color names assigned to the "color circle" in the HSL space defined with s=83 and l=135.
Figure 7B:
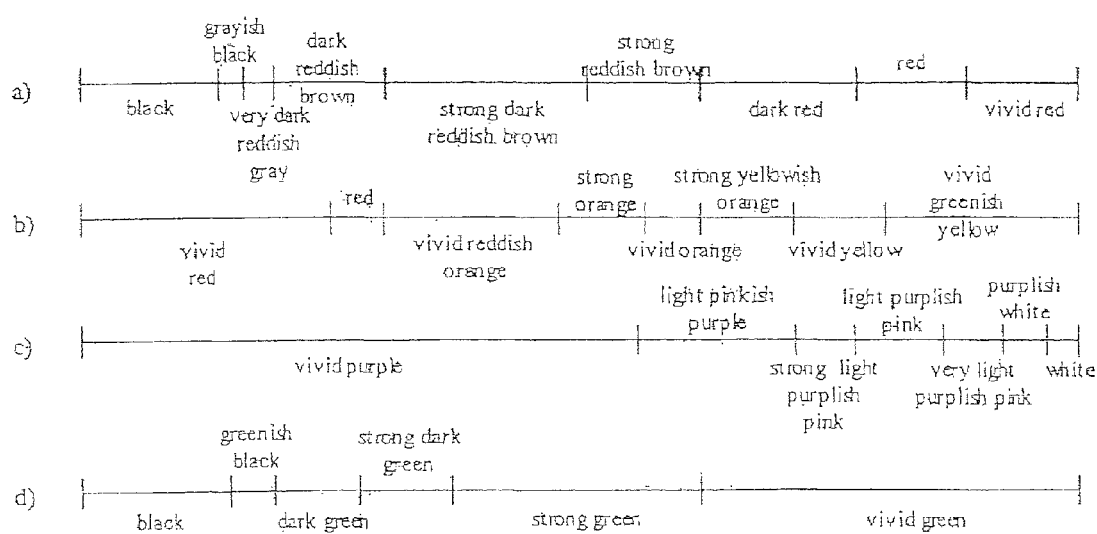
FIG. 7b shows an application of a color naming method to name different color regions for transition of color names along the black-red, red-yellow, purple-white, and black-green lines in the RGB space.

As used by the model in predicting the amount of perceptual similarity, this formula takes into account both the distance and the angle in the HSL space. Therefore, this value is used to modify the Lab distance between the colors cp and cx in the following manner:

$$D(c_p, c_x) = D_{LAB}(c_p, c_x) + k(D_{LAB}(c_p, c_x))D_{LAB}(c_p, c_x)\Delta d(c_p, c_x)$$

i.e. the Lab distance is increased proportionally to the amount of dissimilarity $\Delta d$. The factor k(L) is introduced to avoid modifying distances between very close points, so that k(L)=0 if L<7, and to limit the amount of increase for large L, i.e. k(L)=const, if L>30. FIGS. 7a and 7b show applications of a metric used to name different color regions in the RGB and HSV color spaces. FIG. 7a shows the color names assigned to the "color circle" in the HSL space defined with s=83 and l=135. FIG. 7b shows the transition of color names along the black-red (0<r<255, g=20, b=20), red-yellow (r=235, 0<g<255, b=20), purple-white (0<r<255, g=0, 0<b<255), and black-green lines (r=20, 0<g<255, b=20) in the RGB space.

This approach is now expanded and applied to automatically attach color names to regions and objects in digital images, and to derive a verbal description of the color composition in images. This embodiment, is based at least in part on the fact that the human observation of a scene is typically very different from the recorded image. When describing the color composition of a complex scene (a scene that includes multiple objects, patterns, edges, or colors) human perception aims at constructing a visual representation with "vivid colors" and details across a wide range of lighting conditions. As a matter of fact, the very notion of a "color name" has its roots in the fact that humans perceive and interpret color information independently of the light source—the phenomenon known as color constancy. On the other hand, the teachings of this invention presented so far, generally only allow for naming isolated samples of colors, or attaching color names to individual image pixels; the teachings do not account for color constancy, or the spatial relationships and interactions among the colors.

An embodiment of a method that takes into account the issues listed above and aims to provide a description of the scene consistent with human observation is now described. The algorithm has two parts. The first part deals with the problem of color constancy, while the second one provides image smoothing and segmentation suitable for the extraction of perceived colors.

FIG. 8 is a logic flow diagram that illustrates an example of a method for constructing the image representation that resembles the human observation of a scene and its color content. This method is designed to simulate the processes conducted in the early stages of the human visual system, which performs significant amount of spatial averaging. At step 801, the input image is subjected to a chromatic adaptation transform, to eliminate the differences caused by different illumination conditions. Step 802 performs edge detection. Using the edge information, step 803 performs pixel labeling to distinguish between different types of pixels (e.g. uniform pixels, texture, region boundaries, noise, etc.). In step 804 the image is adaptively smoothed, where the amount of smoothing is determined based on pixel labels. In step 805, the image is subjected to image segmentation to detect important regions and objects in the image. All the steps are conducted by the data processor 101 under the control of a program or program stored in the memory 103.

More specifically, the first step (801) in the described method uses an application of a chromatic adaptation transform, that will compensate for the differences in illumination conditions, with respect to both intensity and spectral characteristics. The present embodiment, utilizes the Von Kries algorithm known to those skilled in the art, to accomplish this task. However it should be noted that experiments have demonstrated that any procedure that stretches the gray axis of the original image and realigns it with the theoretical gray axis for perfectly homogeneous flat-spectrum illumination, performs well in the given problem.

The following steps (802-805) in the method perform spatial averaging and image segmentation that simulate the way humans perceive the color content of images. More specifically, in its early stages the human visual system performs significant amount of spatial averaging, which accounts for the way humans interpret color information. The smoothing process is partly due to the nature of the channel between the retina and the visual cortex, where the neighboring receptors converge into one ganglion, while the groups of ganglions converge to single neurons in the visual cortex. However, the amount of averaging depends on the spatial frequencies, spatial relationships among colors, size of the observed objects and the global context. For example, it is well known that the capability of the human visual system to distinguish different colors drops rapidly for high spatial frequencies. Consequently, humans describe textured areas with a single color, since only spatial averages of the microvariations are perceived. On the other hand, the human visual system does not average isolated edges, as they represent object and region boundaries. Based on these observations, the smoothing and segmentation are carried out by modeling human perception as an adaptive low-pass filter operation, i.e. convolution of the input image with a localized kernel.

Figure 9:
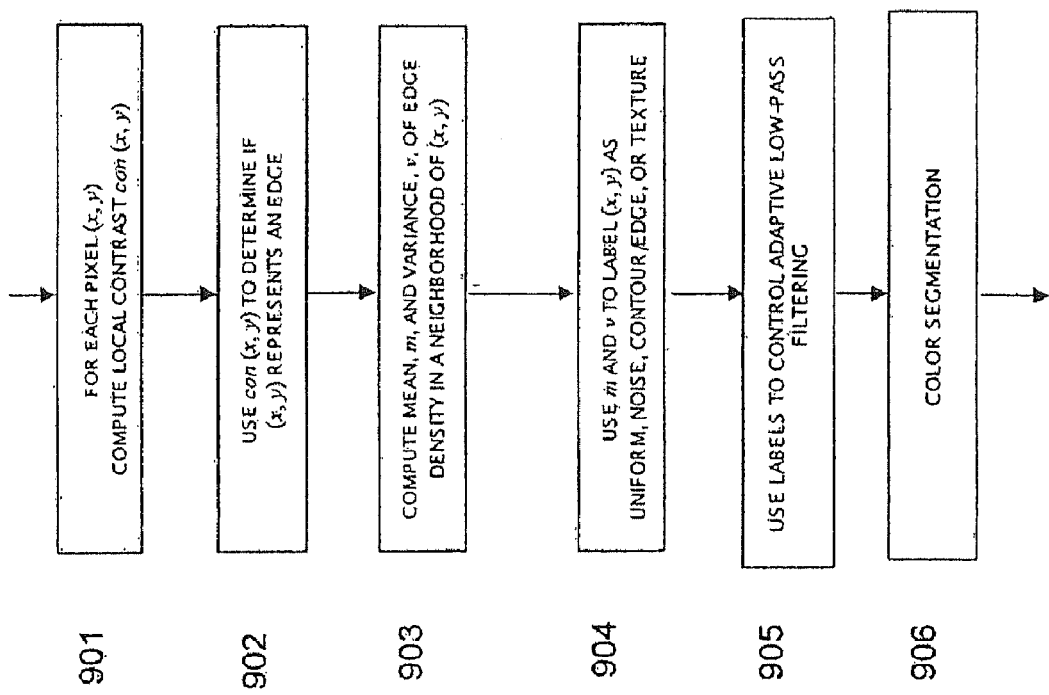
FIG. 9 is a logic flow diagram that illustrates an example implementation of the image smoothing algorithm, followed by the detection of important regions and objects in the image.

FIG. 9 shows a logic flow diagram that illustrates an example of an implementation of the image smoothing algorithm, followed by the detection of important regions and objects in the image. The method is assumed to be executed by the data processor 101 under control of a program or program stored in the memory 103. In step 901, the input image is processed according to the Von Kries transform to eliminate differences in the illumination conditions. Step 902, computes the amount of local contrast for each pixel in the image. In step 903 these values are used to determine if picture represents an edge. Step 904 computes the mean and variance of edge density in a neighborhood of each image pixel. In step 905, the means and variances are used to label pixels into different pixel types (e.g. noise, uniform, color edge, texture edge, coarse texture, fine texture). In step 906, pixel labels are used to control the amount of Gaussian smoothing. In step 907, the smoothed image is subjected to color segmentation.

With even more details, an embodiment of this method, may start by reducing the number of colors in the image via use of, for example, the LBG vector quantization algorithm. The result of color quantization represents a set of colors that optimally represent image colors in the Lab space. The next step is to compute the local color contrast, con(x,y), for each image pixel (x,y) and use it to determine if the pixel represent an edge (e.g. the pixel is considered an edge if its contrast exceeds a predefined threshold $con_{min}$). In the next step, to distinguish between the uniform regions, texture areas, and contour points, a sliding window is used to estimate the mean m, and variance v, of edge density for each pixel. Depending on these estimates the pixels are labeled as: TYPE 1) uniform, m=0, TYPE 2) noise, m<$t_m$, TYPE 3) color edge, i.e. edge between two uniform regions, $t_{m1}$<m<$t_{m2}$, TYPE 4) texture edge, i.e. transition between uniform and textured region (or between two textured regions), $t_{m2}$<m<$t_{m3}$, TYPE 5) coarse texture, m>$t_{m3}$, v>$t_v$, or TYPE 6) fine texture, m>$t_{m3}$, v<$t_v$. The labeling operation produces pixel maps, which control the smoothing process and determine the computation of dominant colors in the following way. The pixels labeled as noise are first removed, i.e. their color is changed into the surrounding uniform color. Since the human eye creates a perception of a single dominant color within uniform regions, the amount of smoothing is largest for the uniform pixels. To allow for the highest amount of smoothing, the radius of the smoothing kernel is chosen adaptively for each uniform pixel, depending on the distance to the closest edge (color or texture). Pixels labeled as color edge (TYPE 3) and texture edge (TYPE 4) are not filtered. Also, since edges do not contribute to the way humans describe color content, these pixels are not used in the computation of color composition. Finally, the amount of averaging performed in textured areas is chosen based on the edge density, so that the amount of averaging is higher for fine textures and lower for coarse textures. Thus, the perceived color at the location (x,y), pc(x,y), is computed as:

pc(x, y)=(c*$g_{N(x,y)}$)(x, y), where $g_{N(x_c,y_c)}$(x, y) is the Gaussian kernel defined as:

$$g_{N(x_c,y_c)}(x, y) = k\exp\left(-\frac{x^2+y^2}{\sigma^2}\right), \sum_{x^2+y^2<N(x_c+y_c)} g_{N(x_c,y_c)}(x, y) = 1$$

and N(x, y) is the radius of the kernel, which depends on the type of pixel in the center of the kernel, ($x_c$,$y_c$) as:

$$N(x, y) = \begin{cases} \|(x, y) - (x_e, y_e)\|, & \text{uniform region, i.e. } (x_c, y_c) \text{ is Type 1} \\ D, & \text{coarse texture, i.e. } (x_c, y_c) \text{ is Type 5} \\ 2D, & \text{fine texture, i.e. } (x_c, y_c) \text{ is Type 6} \end{cases}$$

and ($x_e$,$y_e$) is the edge pixel closest to (x,y). As given by these formulas the smoothing algorithm averages only within uniform and textured regions, thus simulating the behavior of the human visual system. However, in reality, due to imperfections in computing the edge maps, all the boundary pixels cannot be entirely excluded from the smoothing operation. This produces some "graying out" of the resulting image, either globally or in the specific regions. The desaturation of color may cause some regions to be perceived and consequently named quite differently, and there may be a need to consider some color-restoration scheme. Since the main goal is to preserve the same appearance of colors to the human observer as the original image, the color-restoration problem can be viewed as the color-constancy problem. Therefore, a chromatic adaptation transform in the linear color space, may be applied again to stretch the gray axis and minimize the color distortions introduced by averaging across different regions.

In the next step, the smoothed and "color-restored" image is subjected to color segmentation and used as an input to the color naming procedure. For image segmentation, one uses a color-based segmentation algorithm known to those skilled in the art. Prior to the segmentation the color value for each pixel labeled as color edge or texture edge is replaced with the color value of the closest uniform or texture region. The resulting image is then used in conjunction with the color naming method to perform different color naming tasks in images.

Figure 10:
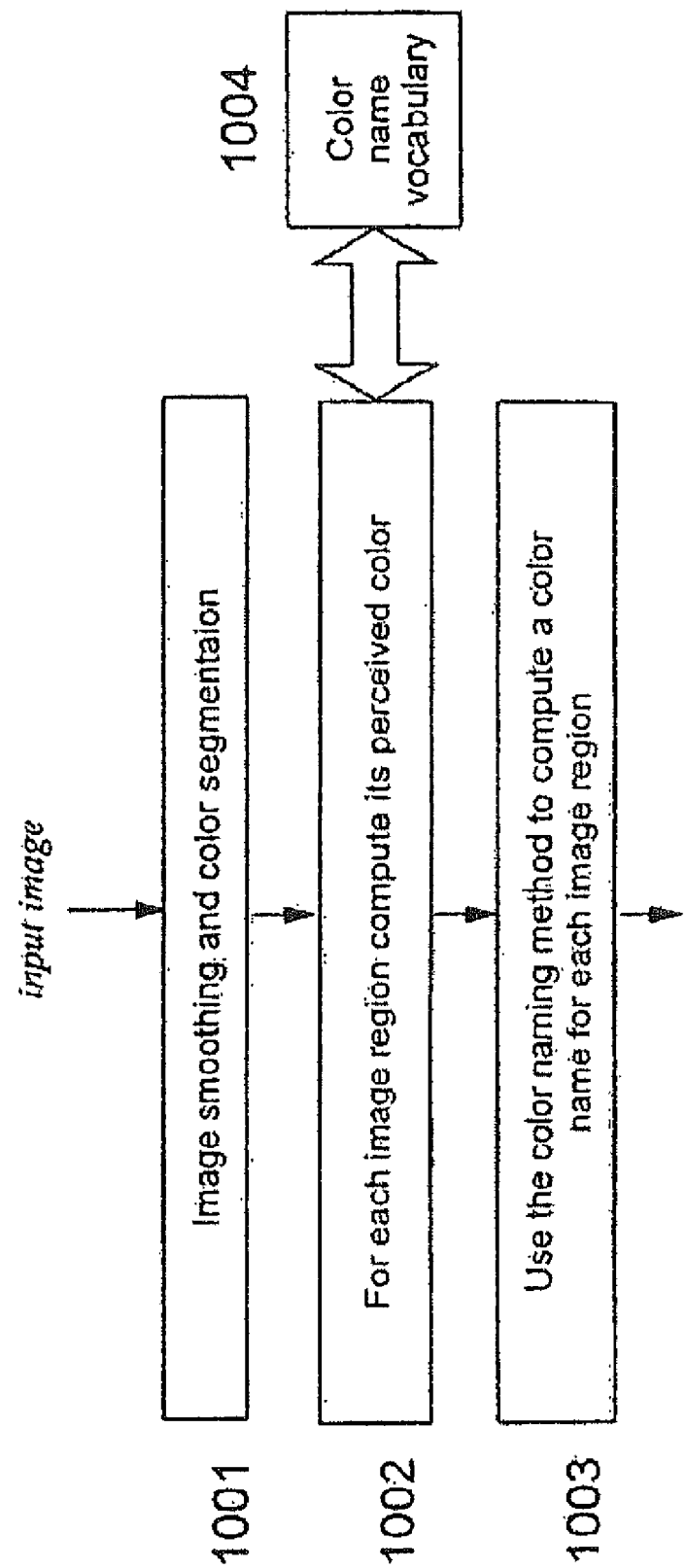
FIG. 10 is a logic flow diagram that illustrates a method for attaching a color name to the regions and objects in the image.

FIG. 10 shows a logic flow diagram that illustrates an example of a method for attaching a color name to the regions and objects in the image. The method is assumed to be executed by the data processor 101 under control of a program or program stored in the memory 103. At step 1001, the input image is subjected to image smoothing and segmentation. At step 1002 the data processing system computes perceived color for each region and each object identified by the step 1001. At step 1003, the data processing system 101 uses the color naming metric to compute the color name for each image region, using its perceived color value as the input into the color naming algorithm. In this embodiment, the perceived color value of the image region is computed by averaging the color values of all perceptually important pixels from that region. Pixel color values are advantageously specified in a linear color space. In current, but not limited implementation of the method, all pixels labeled uniform, coarse texture and fine texture are considered perceptually important, while pixels labeled noise, color edge, and texture edge are not used in computation.

FIG. 11 shows an example of the result of image smoothing, region detection, and attaching the color names to the important regions and objects in the image. FIG. 11 shows: (A) an original input image, (B) image after the chromatic adaptation transform, (C) pixel map with pixels identified as uniform (white pixels), (D) pixel map with color and texture edges (white pixels), (E) pixel map with pixels identified as texture (white pixels), (F) image obtained as a result of adaptive smoothing, (G) image obtained as a result of color segmentation, and (H) image with color names attaches to all important regions.

Figure 12B:
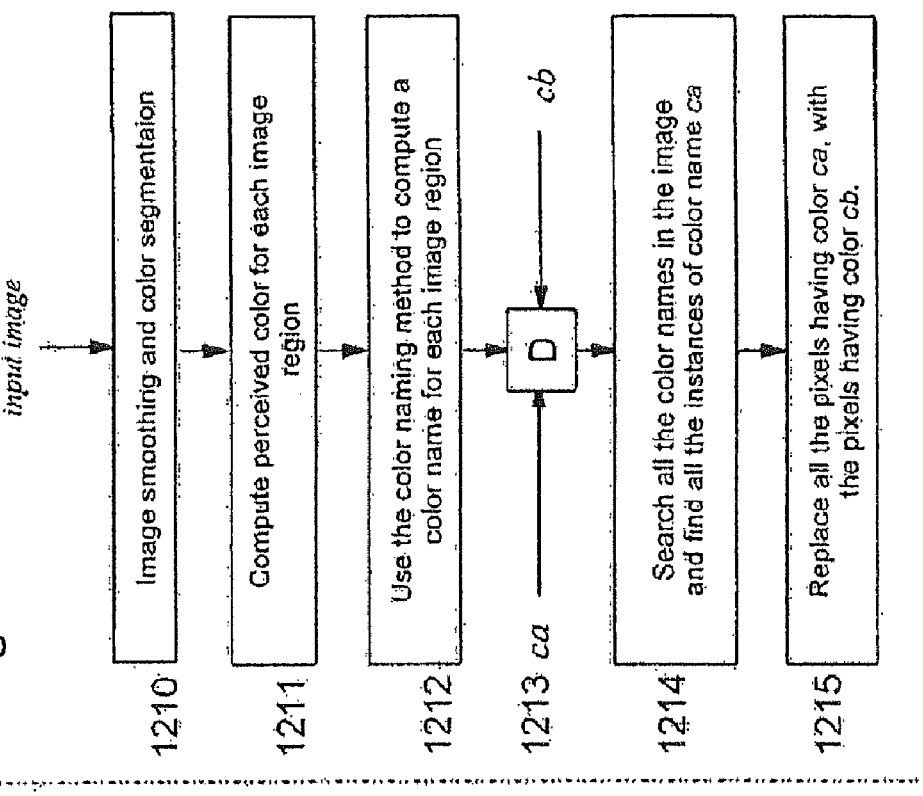
FIG. 12b is a logic flow diagram that illustrates a method for replacing a selected color with a different color.
Figure 12A:
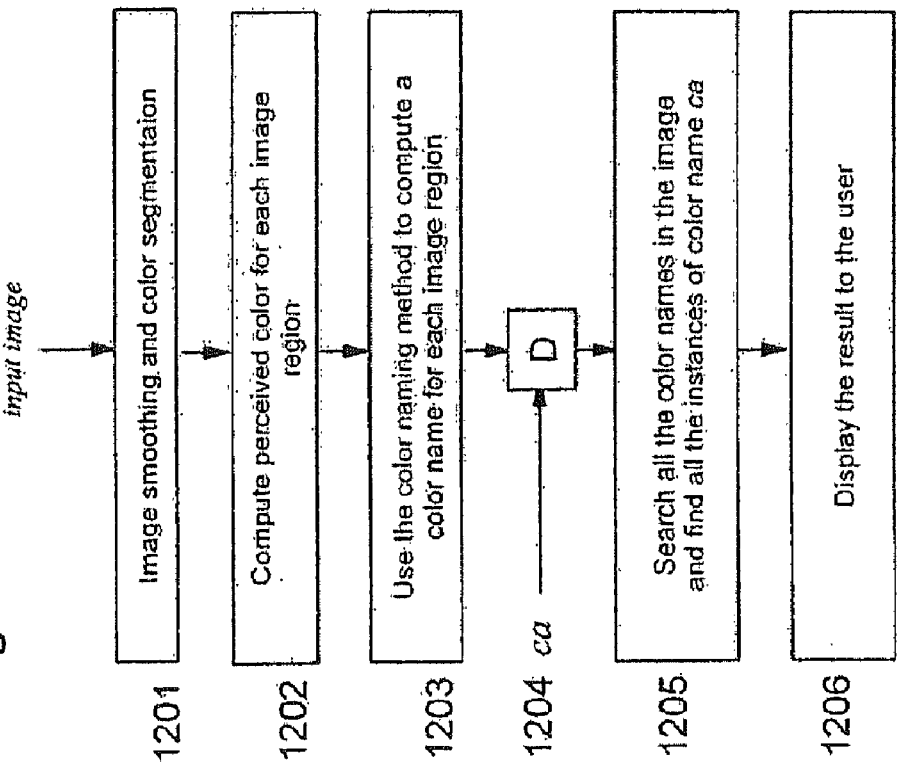
FIG. 12a is a logic flow diagram that illustrates a method for pointing out examples of selected color in the image.

FIG. 12a shows a logic flow diagram that illustrates an example of a method for pointing out examples of selected color in the image. The method is assumed to be executed by the data processor 101 under control of a program or program stored in the memory 103. At step 1201, the input image is subjected to image smoothing and segmentation. At step 1202 the data processing system computes the perceived color for each region and each object identified by the step 1201. At step 1203, the data processing system 101 uses the color naming metric to compute the color name for each image region, based on its perceived color value. At step 1204, using the GUI 104 and 105, the user specifies and example color (or colors) ca. At step E, the data processor 101 searches all the color names in the input image to find all the occurrences of color name ca. At step 1205, using the display part of the GUI 104, the data processing system displays to the user the search result for the given image.

FIG. 12b shows a logic flow diagram that illustrates a method for replacing a selected color with a different color. The method is assumed to be executed by the data processor 101 under control of a program or program stored in the memory 103. At step 1210, the input image is subjected to image smoothing and segmentation. At step 1211 the data processor 101 computes the perceived color for each region and each object identified by the step 1210. At step 1212, the data processor 101 uses the color naming metric to compute the color name for each image region, based on its perceived color value. At step 1213, using the GUI 104 and 105, the user specifies the color (or colors) to be replaced ca, and the replacement color (or colors) cb. At step 1214, the data processor 101 searches all the color names in the input image to find all the occurrences of color name ca. At step 1215, the data processor 101 replaces all the pixels having color ca, with the pixels having color cb.

An important application of these teachings is for example, in a method for automatically generating a verbal description of overall color composition in images. If the color name vocabulary and syntax are derived in a perceptual way, to reflect human behavior in color categorization, the teachings of this invention allow for describing color composition at different accuracy levels. These different precision levels correspond to different color naming patterns in humans. For example, people mostly use fundamental level when referring to well-known objects, or when color-related information is not considered important. According to the described subjective experiments, the descriptions of photographic images are mainly formulated with the coarse or medium precision, while the color names at the detailed level are typically used when describing specific objects or regions, or emphasizing the difference among them. Specifically: 1) fundamental level captures the behavior of our subjects in the Color Listing Experiment, 2) descriptions of the photographic images in the Color Composition Experiment were mainly given with the coarse or medium precision, and 3) color names at the detailed level were used when describing isolated color samples (Color Naming Experiments), or specific objects and regions (Color Composition Experiment).

FIG. 13 illustrates one example, but not limited embodiment of the rules that describe different accuracy levels in expressing the color composition of an image. These rules are derived based in the findings from the previously described subjective experiments. More specifically, at the fundamental level, the color names are expressed as <generic hue> or <generic achromatic term> from the syntax described in FIG. 2. At the coarse level, color names are expressed as <luminance><generic hue>, or <luminance><generic achromatic term>. At the medium level, color names are obtained by adding the <saturation> to the coarse descriptions. Finally, at the detailed level, the complete <color name> as specified in FIG. 2 is used.

Figure 15:
FIG. 15 is an example of the result of the computation of color composition.

FIG. 14 shows a logic flow diagram that illustrates an example of a method for the computation of the verbal description of the color composition of an input image. The method is generally executed by the data processor 101 eliminates all the perceptually insignificant colors, or remaps them into the closest perceptually important color. In current but not limited embodiment of this method, noise pixels, which are not perceived by the human visual system, are remapped into the closest uniform color, while the other perceptually insignificant pixels (such as region boundaries, and transitions between the regions) are eliminates (i.e. these pixels are not considered in the next steps). At step 1403, the data processor 101 computes the color name for each perceptually significant image pixel, based on its color value. At step 1404, the data processing system loads a set of rules that describe different color naming patterns in humans. At step 1405, the data processor 101 computes the histogram of color names for each accuracy level. FIG. 15 shows an example of results of the computation of color composition.

It should be noted that while the foregoing methods and system can be used to attach color names to individual pixels, samples of color, regions and objects in images and to derive the description of color composition, they can be used in many other applications involving manipulation with color values, color analysis and color naming in image processing, video processing, visualization, computer graphics and human-machine interaction. To start with, using color names to label regions can often improve the result of image segmentation, since the neighboring regions that share the same color name can be merged. In many cases color names only, or in combination with other features (such as spatial attributes, boundary and size features), can provide valuable information about the analyzed images and reveal their semantics. For example, a picture image having regions labeled vivid blue or vivid purplish blue found in the upper part of the image, may represent sky on a bright sunny day. In the same picture regions with regular boundaries/geometry and bright saturated colors are very likely to be man-made objects. Similarly, the flowers shown in a picture can be easily detected based on the relationships between the curvature and color of say, a vivid reddish purple region, and the neighboring green regions. Overall color composition, as generated with the teachings of this invention, often captures the atmosphere in the scene. For example, by combining the linguistic terms from the color name syntax described in teachings of this invention, the scene shown in FIG. 15b can be described as "brownish", and easily related to a man-made environment. Another example of what can be accomplished by adding the color naming ability to the traditional image features (e.g. regions, lines, texture, etc.). By merging all the descriptors, it can be easily concluded that an image is very likely to be an outdoor scene, probably a cityscape or a man-made structure seen from the large viewing distance. Assuming the hypothesis is correct, a step further would be to conclude "the weather wasn't really nice when the picture was taken". Color naming ability may be implemented as a part of Artificial Intelligence Systems. For example it is also within a scope of these teachings to manipulate a robot by naming and describing the objects it should pick from the production line. In such a case a digital image robot receives would be subjected to the processing shown in FIG. 10, and the spatial location of the named color within the digital image, would be remapped to the actual physical location on the production line.

Thus the present invention provides a method employing a vocabulary of color names in assigning a color name to a pixel in a digital representation, including the steps of: providing the vocabulary of color names with a plurality of color prototypes, each color prototype having a prototype color name and a corresponding prototype color value; comparing a pixel color value of the pixel to the prototype color value of each color prototype in the vocabulary, and obtaining a color match value for the each color prototype in the vocabulary; determining a closest color match value resulting from the step of comparing; and assigning to the pixel a particular prototype color name corresponding to the closest match value.

In some embodiments the method includes forming the vocabulary of color names, includes the steps of: obtaining at least one general set of essential color names, each essential color name having a corresponding color value; whereby each color name includes a hue descriptor, brightness modifier, and saturation modifier; and selecting a subset of at least one general set in meeting an application desire for the vocabulary of color names; and/or acquiring a digital representation of a scene, employing the vocabulary in providing a description of a color composition in the scene.

Thus the present invention provides a method obtaining a vocabulary of color names, acquiring a digital representation of a scene, and employing the vocabulary in providing a description of a color composition in the scene.

The aspects of this invention also provides a tool for enriching user interfaces and man-machine interaction. For example, a techniques made possible by this invention, may allow a web designer to select and manipulate colors for the web page via a voice interface and speech recognition system. The same tools apply to many design processes, such as interior design, coloring of CAD models, architecture, design of textiles and prints, etc. The methods may be included as a part of e-commerce tools, where a user may type his search for a "light brown sofa", and in addition to the text search, a database of images may be analyzed to find the objects that match the description.

Therefore, while methods and system have been disclosed for deriving color names of individual colors, color samples image pixels, and for describing colors and color composition in images, it should be appreciated that these teachings are not to be limited to only the presently described embodiments disclosed herein, nor is this invention to be limited in any way by the specific examples if color names, color syntax, color naming rules and subject matter that were disclosed above.

Thus it should be apparent that these teachings are clearly not intended to be limited only to processing color values and collection of digital images stored in a computer memory devices, or in some form of computer readable media. As such, the various descriptions found above should be viewed as being exemplary of the teachings of this invention, as these descriptions were provided as an aid in understanding the teachings of this invention, and were not intended to be read in a limiting sense upon the scope and practice of this invention.

In some embodiments, the invention is an article of manufacture comprising a computer usable medium having computer readable program code means embodied therein for causing assignment of a color name, the computer readable program code means in the article of manufacture comprising computer readable program code means for causing a computer to effect the steps of a method of this invention. In other embodiments, the invention is implemented as a program storage device readable by machine, tangibly embodying a program of instructions executable by the machine to perform method steps for assigning a color name, the method steps comprising the steps of a method of this invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method, comprising:
   computing a simplified representation of a scene consistent with human observation of the scene, including:
   applying chromatic transformation to accommodate for different illumination conditions;
   labeling pixels in the scene into different pixel types;

performing adaptive smoothing of said image where the amount of smoothing around each pixel depends on the type of the pixel;

determining perceptually significant pixels and perceptually insignificant pixels; and reapplying chromatic transformation to preserve the color appearance to a human observer.

2. A computer program product comprising a non-transitory, computer readable storage medium having computer readable program code stored therein, that when executed, implements a method, the method comprising:

computing a simplified representation of a scene consistent with human observation of the scene, including:

applying chromatic transformation to accommodate for different illumination conditions;

labeling pixels in the scene into different pixel types;

performing adaptive smoothing of said image where the amount of smoothing around each pixel depends on the type of the pixel;

determining perceptually significant pixels and perceptually insignificant pixels; and reapplying chromatic transformation to preserve the color appearance to a human observer.

3. An apparatus, comprising:

a data processing system configured to compute a simplified representation of a scene consistent with human observation of the scene, including:

applying chromatic transformation to accommodate for different illumination conditions;

labeling pixels in the scene into different pixel types;

performing adaptive smoothing of said image where the amount of smoothing around each pixel depends on the type of the pixel;

determining perceptually significant pixels and perceptually insignificant pixels; and reapplying chromatic transformation to preserve the color appearance to a human observer.

* * * * *